US010983199B2

(12) United States Patent
Adams et al.

(10) Patent No.: US 10,983,199 B2
(45) Date of Patent: Apr. 20, 2021

(54) VEHICLE SENSOR CALIBRATION AND LOCALIZATION

(71) Applicant: Zoox, Inc., Menlo Park, CA (US)

(72) Inventors: Derek Adams, Santa Clara, CA (US); Ian Baldwin, Hayward, CA (US); Bertrand Robert Douillard, Palo Alto, CA (US); Jesse Sol Levinson, Redwood City, CA (US)

(73) Assignee: Zoox, Inc., Foster City, CA (US)

( * ) Notice: Subject to any disclaimer, the term of this patent is extended or adjusted under 35 U.S.C. 154(b) by 485 days.

(21) Appl. No.: 15/674,853

(22) Filed: Aug. 11, 2017

(65) Prior Publication Data

US 2019/0049566 A1 Feb. 14, 2019

(51) Int. Cl.
*G05D 1/02* (2020.01)
*G01S 17/42* (2006.01)
(Continued)

(52) U.S. Cl.
CPC .......... *G01S 7/4972* (2013.01); *G01C 15/002* (2013.01); *G01S 17/42* (2013.01);
(Continued)

(58) Field of Classification Search
CPC ....... G01C 15/002; G01S 17/42; G01S 17/87; G01S 17/89; G01S 17/936; G01S 7/4972; G05D 1/024
(Continued)

(56) References Cited

U.S. PATENT DOCUMENTS 9,146,315 B2 9/2015 Bosse et al.
9,612,123 B1 4/2017 Levinson et al.
(Continued)

FOREIGN PATENT DOCUMENTS

EP 3078935 10/2016
GB 2507560 5/2014

OTHER PUBLICATIONS

The PCT Search Report and Written Opinion dated Dec. 19, 2018, for PCT Application No. PCT/US2018/045616, 20 Pages.
(Continued)

*Primary Examiner* — John E Breene
*Assistant Examiner* — Jeffrey P Aiello
(74) *Attorney, Agent, or Firm* — Lee & Hayes, P.C.

(57) ABSTRACT

Perception sensors of a vehicle can be used for various operating functions of the vehicle. A computing device may receive sensor data from the perception sensors, and may calibrate the perception sensors using the sensor data, to enable effective operation of the vehicle. To calibrate the sensors, the computing device may project the sensor data into a voxel space, and determine a voxel score comprising an occupancy score and a residual value for each voxel. The computing device may then adjust an estimated position and/or orientation of the sensors, and associated sensor data, from at least one perception sensor to minimize the voxel score. The computing device may calibrate the sensor using the adjustments corresponding to the minimized voxel score. Additionally, the computing device may be configured to calculate an error in a position associated with the vehicle by calibrating data corresponding to a same point captured at different times.

20 Claims, 12 Drawing Sheets

(51) Int. Cl.
*G01S 17/89* (2020.01)
*G01S 7/497* (2006.01)
*G01C 15/00* (2006.01)
*G01S 17/87* (2020.01)
*G01S 17/931* (2020.01)

(52) U.S. Cl.
CPC .............. *G01S 17/87* (2013.01); *G01S 17/89* (2013.01); *G01S 17/931* (2020.01); *G05D 1/024* (2013.01)

(58) Field of Classification Search
USPC ....... 700/250, 253, 258; 701/26, 301; 702/1, 702/104, 150, 155, 152, 189, 724
See application file for complete search history.

(56) References Cited

U.S. PATENT DOCUMENTS

| 2010/0290685 | A1* | 11/2010 | Wein | G06T 7/33 382/131 |
| 2011/0007072 | A1* | 1/2011 | Khan | G06T 17/00 345/420 |
| 2014/0240690 | A1* | 8/2014 | Newman | G01S 7/4808 356/4.01 |
| 2014/0368807 | A1* | 12/2014 | Rogan | G01S 17/50 356/28 |
| 2015/0285901 | A1* | 10/2015 | Rose | G01S 7/41 382/154 |
| 2017/0270711 | A1* | 9/2017 | Schoenberg | G02B 27/017 |
| 2017/0347120 | A1* | 11/2017 | Chou | H04N 19/597 |
| 2019/0049242 | A1 | 2/2019 | Adams et al. | |
| 2019/0163958 | A1* | 5/2019 | Li | G06T 15/08 |

OTHER PUBLICATIONS

The PCT Invitation to Pay Additional Fees mailed on Oct. 19, 2018 for PCT Application No. PCT/US2018/045616, 14 pages.
Burgard, et al., "Introduction to Mobile Robotics, Graph Based SLAM", retrieved on Jun. 5, 2017 at <<http://ais.informatik.uni-freiburg.de/teaching/ss13/robotics/slides/16-graph-slam.pdf>>, 25 pages.
Dellaert, "Factor Graphs and GTSAM a Hands-on Introduction", Technical Report No. GT-RIM-CP&R-2012-002, Sep. 2012, 27 pages.
Grisetti, et al., "A Tutorial on Graph-Based SLAM", Department of Computer Science, University of Freiburg, 79110 Freiburg Germany, IEEE, Intelligent Transportation Systems Magazine 2.4 (2010) : 31-43, 11 pages.
Olson, et al., "Fast Iterative Alignment of Pose Graphs with Poor Initial Estimates", MIT Computer Science and Artifical Intelligence Laboratory, Cambridge, MA 02139. Proceedings 2006 IEEE International Conference, 8 pages.
Strasdat, et al., "Visual SLAM Why Filter", Department of Computing Imperial College London, UK. Image and Vision Computing 30.2 (2012) : 65-77. 36 pages.
Final Office Action dated Oct. 5, 2020 for U.S. Appl. No. 15/675,487, "Sensor Perturbation", Adams, 11 pages.
Non Final Office Action dated May 7, 2020 for U.S. Appl. No. 15/675,487 "Sensor Perturbation" Adams, 11 pages.

* cited by examiner

VEHICLE SENSOR CALIBRATION AND LOCALIZATION

BACKGROUND

Many vehicles utilize sensor data for various functions, such as navigation, guidance, and obstacle avoidance. Each of the various functions can be necessary for the effective operation of the vehicles. As such, it is important for the sensors to be calibrated, to provide accurate input to vehicle computing systems. Current calibration techniques can be time consuming and computationally expensive. Additionally, many current calibration techniques are limited to offline processes, requiring a vehicle to be taken out of service if a sensor is out of calibration and/or alignment.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
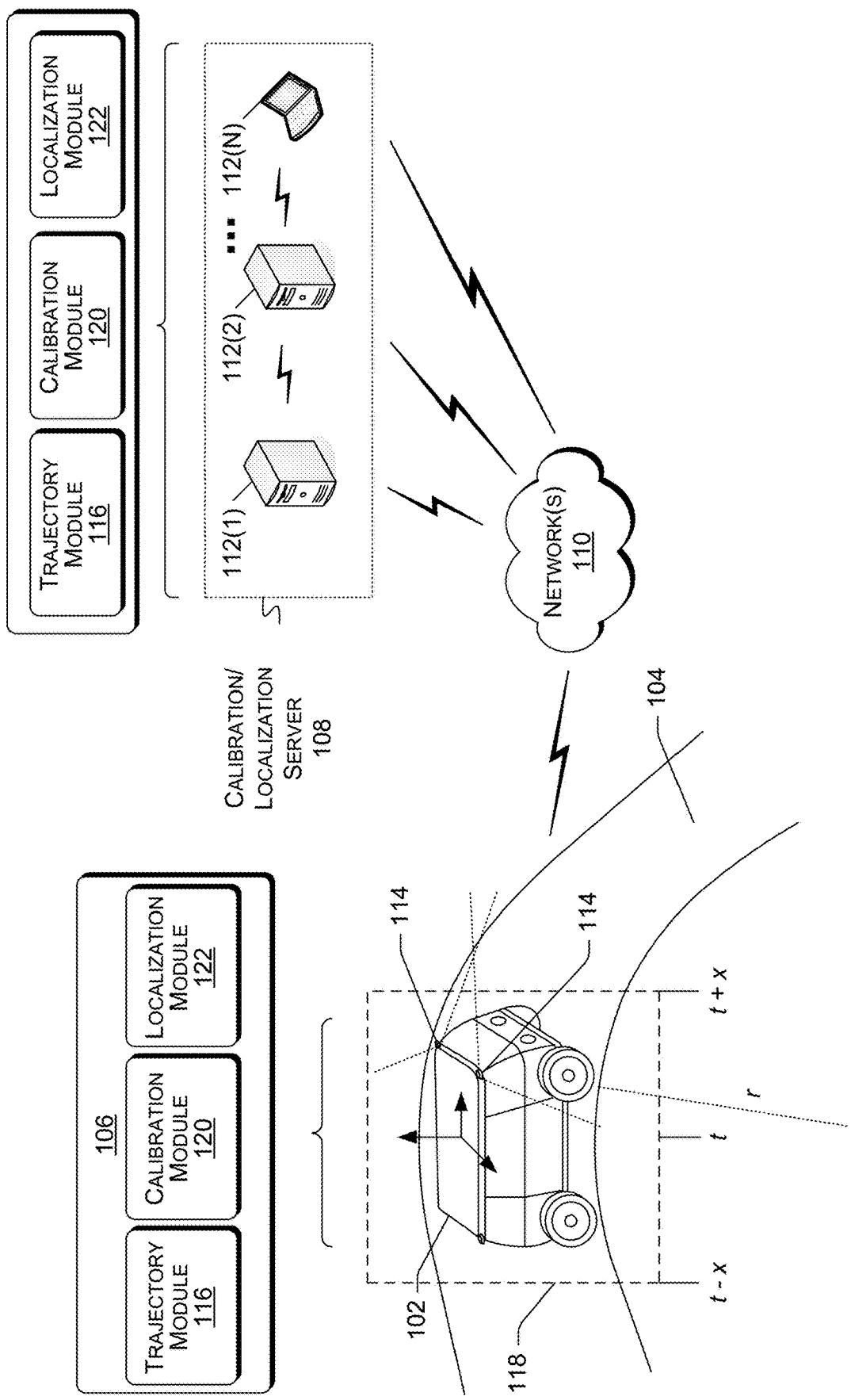
FIG. 1 illustrates an example environment in which a sensor calibration and localization system can be used.

This disclosure is generally directed to methods, apparatuses, and systems for calibrating one or more sensors of a vehicle and accurately localizing the vehicle using sensor data. The vehicle may include an autonomous, semi-autonomous, and/or manned vehicle that is configured with one or more sensors for navigation, guidance, obstacle avoidance, or the like. The one or more sensors may include light detection and ranging (LIDAR) sensors, radio detection and ranging (RADAR) sensors, sound detection and ranging (SONAR) sensors, image capture devices (e.g., RGB cameras, intensity cameras, IR cameras, stereo cameras, depth cameras, etc.), or other sensors. As a non-limiting example, the vehicle may be an autonomous vehicle configured with eight (8) light detection and ranging (LIDAR) sensors. Each of the LIDAR sensors may return data corresponding to detected surfaces in an environment. The data may be represented as points (e.g., data points) having coordinates (e.g., Cartesian, polar, etc.) corresponding to at least a part of the detected surface. When mounted on the vehicle, the LIDAR sensors may require calibration with respect to each other to collectively view the detected surfaces clearly. Additionally, the LIDAR sensors may require calibration together with respect to the vehicle to collectively view the detected surfaces in correct positions and/or orientations relative to the vehicle.

The sensor calibration described herein can be performed with data collected when the vehicle is in a region of interest, which may correspond to a route or path traveled by the autonomous vehicle. The region of interest can include a central location comprising certain characteristics, such as a radius of curvature, a designated speed, a position of the vehicle, or the like. The region of interest may additionally include a time window centered around the central location. The time window may include a fixed number of seconds before and after the central location. For example, a region of interest can include an area corresponding to motion of the vehicle one second before an apex of a curve, and one second after the apex. The data collected while the vehicle is within one second of the apex may be used for sensor calibration.

In some examples, a computing device of the vehicle may be configured to determine the region of interest. In some examples, the computing device may process input from one or more motion sensors (e.g., inertial measurement units (IMU) sensors, accelerometers, gyroscopes, rotary (wheel) encoders, etc.), to determine the region of interest. In some examples, a remote computing device may be configured to determine the region of interest based on motion sensor data received from a vehicle. In such examples, the remote computing device may designate an area as a region of interest for future sensor calibration and/or calibration verification. For example, the remote computing device may receive motion sensor data from a first vehicle, and may identify a yaw rate at a location in a curve that corresponds to a region of interest. Based on the identification of the yaw rate, the remote computing device may designate the location as a central location of a region of interest. The remote computing device may additionally designate a fixed interval on either side of the central location as the region of interest. The remote computing device may subsequently receive LIDAR data from a second vehicle in the region of interest, and may calibrate the sensors of the second vehicle using data captured in the region of interest. In some examples, a vehicle may perform localization against map data using LIDAR data, wherein the map data comprises information indicating that some location is associated with a region of interest as may have been previously determined.

The sensor calibration described herein can be performed while the vehicle is in an online mode (e.g., in operation and/or in communication with a remote server computing device) and/or in an offline mode (e.g., out of operation and/or not in communication with the remote server computing device). A calibration computing device (e.g., computing device of the vehicle and/or the remote computing device) may receive the sensor data (e.g., data points at respective coordinates) from the one or more sensors. The calibration computing device may filter the sensor data for data collected in the region of interest, and may process the filtered data to calibrate the one or more sensors. Such calibration may be performed by projecting sensor data into a voxel space and performing an anxious search, as described in detail below. In some examples, data captured by the calibrated sensors may be used to enable control of the vehicle.

Voxel Residuals

In some examples, various sensor data may be accumulated into a voxel space or array. Such a voxel space may be a three-dimensional representation comprising a plurality of voxels. As a non-limiting example, a voxel space may be a rectangular cuboid having a length, a width, and a height, comprising a plurality voxels, each having a similar shape. In some examples, the voxel space is representative of an environment such that an origin of the voxel space may be described by a position and/or orientation in an environment. Similarly, each voxel may be described by one or more of a position and orientation in an environment, or a coordinate relative to an origin of the voxel space. In such examples, each voxel may represent a portion of the environment.

In some examples, each voxel may be associated with statistical data representing multiple data points, such as, but not limited to, a number of data points, an average position of the data points, a covariance of the data points, and the like. As such, data received from one or more sensors may be used to populate one or more voxels. Accumulation of data may correspond to combining, as described herein, data from a single sensor over a time period, or data from multiple sensors at a single time, or over a period of time. In some examples, the statistical data may be associated with a voxel, based at least in part on sensor data. As a non-limiting example, consider LIDAR sensor data from a LIDAR device. The sensor data may comprise an intensity, range, a position (e.g. an X, Y, Z), and/or an elevation, azimuth, and the like. Such a data position may be projected into the voxel space based on a position and orientation of the sensor in the environment relative to the voxel space in the environment, as well as the position of the sensor data relative to the sensor. In such an example, once projected into the sensor space, the sensor data may be associated with a particular voxel which encompasses the portion of the environment corresponding to the position of the sensor data when projected into the voxel array (e.g. a cubic voxel having 50 cm sides having a position in the environment of <0 m, −2 m, 10 m> would encompass a LIDAR return data with a position of <0.2 m, −1.9 m, 10.4 m>). Combining data may correspond to one or more of updating the number of data points, the average position of points, or the covariance for the particular voxel, based on the sensor data. In such examples, such statistical representations may allow for faster processing, reduced memory consumption, and the like, as opposed to storing every piece of sensor data acquired.

Various calculations may be performed on at least a portion of the data associated with a particular voxel. As a non-limiting example, it is possible to calculate a best fit plane based on the statistical data alone by using a principal component analysis or Eigen value decomposition of the covariance. In such an example, the smallest eigenvector may correspond to a normal of a plane and a corresponding eigenvalue may correspond to an effective thickness of the plane.

A residual may be assigned to each voxel. Where a number of points is above a threshold (e.g., 2), a residual may be calculated. In some examples, the threshold may be determined based on the ability to perform one or more calculations. Such a residual may be a smallest eigenvalue, as described above. In some examples, the residual may be computed as the distance between an average position to a plane. In such examples, the plane may be calculated based on similar methods as above. Additionally, or in the alternative, the plane may be derived from a previous calculation and/or based at least in part on a 3D mesh provided of the environment. In those examples, where the number of points is below the threshold, an occupancy penalty may be imposed on that voxel by assigning the residual of that voxel a maximum value and identifying that voxel as "invalid." In some examples, the maximum value may be one or more of a length, width, height, or diagonal of the voxel.

Additionally, or in the alternative, each voxel that has at least one data point may be associated with a maximum occupancy score. As a non-limiting example, such an occupancy score may be the maximum residual value, though any other value is contemplated. Those voxels in which the number of points is zero may have an occupancy score of 0.

In some examples, it is possible to calculate a total residual, or a residual for the entire voxel space. In some examples, such a total residual may be calculated as the sum over all voxels of the residual per voxel and the occupancy score of the voxel.

$$r_{array} = \sum_{voxels} r_{voxel} + o_{voxel}$$

Anxious Search

In some examples, the total residual may be minimized using an anxious search, as will be described in detail herein. As above, sensor data is associated with voxels based, at least in part, on the position and orientation (or pose) of the sensor from which the data was generated (i.e. by projecting from a sensor position into the voxel space). By applying a transform (i.e. one or more of a translation or a rotation) to the data source (e.g. the sensor) and reprojecting the data into the voxel space based on the new sensor pose, a new total residual may be calculated. As described in detail herein, such an anxious search determines a transformation to apply to a data source which minimizes the total residual.

To find such a transform, the anxious search may comprise a number of magnitudes and a number of search directions. In some examples, there may be 26 search directions for a translational component (i.e. a +1, 0, −1 for each translational component, excluding the search direction where there is no translation). An enumeration of these search directions, and corresponding total residual (R), is shown in Table 1 below. Additionally, or in the alternative, 26 additional search directions for a rotational component (i.e., pitch, roll, yaw) may be similarly determined. Additionally, or in the alternative, there may be 3^6−1 search directions corresponding to all possible combinations of a +1, 0, or −1 movement in any of the translation or rotation components (excluding where there is no movement). In some examples, the magnitudes may be a predefined set (e.g. {0.25 m, 0.5 m, 1 m, 2 m, 4 m, 8 m}). In other examples, the magnitudes may correspond to a number of scalar multiples of a single magnitude.

TABLE 1

| X | Y | Z | R |
|---|---|---|---|
| +1 | +1 | +1 | $R_1$ |
| +1 | +1 | 0 | $R_2$ |
| +1 | +1 | −1 | $R_3$ |
| +1 | 0 | +1 | $R_4$ |

TABLE 1-continued

| X | Y | Z | R |
|---|---|---|---|
| +1 | 0 | 0 | $R_5$ |
| +1 | 0 | −1 | $R_6$ |
| +1 | −1 | +1 | $R_7$ |
| +1 | −1 | 0 | $R_8$ |
| ... | ... | ... | ... |
| −1 | −1 | −1 | $R_{26}$ |

Once a set of search directions and magnitudes are determined, the anxious search may iterate through any one or more combinations of the search directions and magnitudes to determine an optimal transform. Such a search may proceed as follows. An original total residual may be calculated. Each search direction may then be scaled by each magnitude in the set of magnitudes. A transformation may be determined based on each of the scaled search directions. For each transformation, the sensor may be transformed from the original pose and the sensor data may be subsequently reprojected into the voxel space based at least in part on the new sensor pose. Based on the reprojected sensor data, a new total residual is calculated. For each magnitude, if the lowest total residual is smaller than some percentage (e.g. 80%) of the original total residual, select the transformation and the total residual as the best estimated transform and corresponding residual. In those examples in which the lowest total residual is not lower than some percentage of the original total residual, the original pose is not altered. Such a process may be repeated for all magnitudes in the set. An example for the anxious search algorithm is illustrated in Table 2, below.

TABLE 2

Algorithm 1 Anxious Search

```
1.  procedure anxious_search(original_pose, sensor_data, voxel_space)
2:      search_directions = enumerate_search_directions( );
3:      magnitudes ← [0.25m, 0.5m, 1m, 2m, 4m, 8m];
4:      pose ← original_pose;
5:      original_total_residual = total_residual(voxel_space);
6:      lowest ← original_total_residual;
7:      best_pose ← pose;
8:      foreach magnitudes (in descending order):
9:          foreach search_directions:
10:             new_lowest ← lowest;
11:             transform = generate_transform(magnitude*search_direction);
12:             new_pose = generate_pose(transform, pose);
13:             project(sensor_data, new_pose, voxel_space);
14:             new_total_residual = total_residual(voxel_space);
15:             if (new_total_residual < new_lowest)
16:                 new_lowest ← new_total_residual;
17:                 best_pose ← new_pose;
18:             if (new_lowest < fraction*original_total_residual)
19:                 lowest ← new_lowest;
20:                 pose ← best_pose;
21:     return pose;
```

Calibration

As described in detail herein, an anxious search may be used to minimize a total residual. Such a minimization may be used to calibrate one or more sensors of an autonomous vehicle substantially simultaneously, as performed by the calibration computing device (i.e. determine sensor extrinsics and/or intrinsics). In such examples, the minimized residual value may correspond to a crispness (e.g., clarity) measurement of the voxel.

In various examples, the calibration computing device may be configured to verify the calibration of one or more sensors on the vehicle. The calibration verification can be performed while the vehicle is online or offline. Calibration performed online may refer to calibrations performed by incorporating new sensor data continuously. Calibration performed offline may refer to those calibrations in which previously recorded data is used in a calibration.

In some examples, calibration may be performed by continuously refining the voxel space from a coarse discretization to a fine discretization. For example, a given voxel space may be discretized as having 5×5×5 voxels (each voxel being a cube of 2 m per side), 10×10×10 voxels (each voxel being a cube of 1 m per side), 20×20×20 voxels (each voxel being a cube of 0.5 m per side), and so on. In some examples, the coarser discretizations may be generated by combining the statistical data from finer discretizations, as described in detail above with respect to accumulating data.

In some examples, the voxel resolution may be subsequently discretized to have a finer and finer resolution. In such examples, a total residual may be calculated for each resolution using the Eigenvalue decomposition calculation. For each resolution, an anxious search may then be performed for each sensor of the one or more sensors individually, calculating the total residual using the point-to-plane calculation method. In such a method, data corresponding to the one or more remaining sensors may be held fixed during the anxious search. If an improvement in the total residual is found via the anxious search, a corresponding transformation may be stored.

In some examples, after determining a transformation for each of the sensors individually, all sensors may be transformed simultaneously using their corresponding transform. Subsequently, an updated total residual may be calculated using the Eigenvalue decomposition calculation. If the updated total residual is less than the previously computed total residual, keep the sensors as transformed and repeat the anxious search for each sensor individually.

If the updated residual is not less than the previously computed total residual (or some fraction thereof), the calibration may proceed to performing an anxious search of all the sensors simultaneously. In such a search, each sensor may be transformed by the same transformation (i.e. a block transform). In some examples, the anxious search may transform a reference origin used to describe the position and orientation of the one or more sensors. As a non-limiting example, such a reference origin may be a center point of an autonomous vehicle to which one or more sensors is attached. In some examples, a resulting block transform of the anxious search may be stored. A total residual may be calculated as an updated score using the block transform transformation. If the updated score is not less than the updated residual, then a voxel resolution may be increased and the above referenced process may be repeated.

An example algorithm for calibration is demonstrated in Table 3, below.

camera(s), GPS(s), IMU(s), wheel encoder(s), and the like. The position measurement error process may be used to compare sensor data returned from the one or more sensors with expected data, based on the estimated pose (as may be determined from a predefined map, data store, or the like). Such a measurement error may be used for compensating future estimates and/or refining a current position and/or orientation of the one or more sensors. An example measurement position error algorithm is shown below in Table 4.

TABLE 3

Algorithm 2 Calibration

```
1:  procedure calibrate(Array sensor_poses, voxel_space, Array sensor_data):
2:      voxel_sizes ← [5, 10, 20, 40];
3:      fraction ← 0.8;
4:      lowest = total_residual(voxel_space, Eigenvalue_decomp);
5:      foreach voxel_sizes (in ascending order):
6:          do {
7:              new_poses = sensor_poses;
8:              foreach sensor_poses: {
9:                  new_voxel_space = change_resolution(voxel_space, voxel_size, sensor_data);
10:                 project(sensor_poses(all but n), sensor_data(all but n), new_voxel_space);
11:                 new_poses(n) = anxious_search(sensor_poses(n),
12:                     sensor_data(n), new_voxel_space, point2plane);
13:             }
14:             new_voxel_space = change_resolution(voxel_space, voxel_size, sensor_data);
15:             project(new_poses, sensor_data, new_voxel_space);
16:             updated_score = total_residual(new_voxel_space, Eigenvalue_decomp);
17:             previous_score = lowest;
18:             if (updated_score < lowest) {
19:                 lowest = updated_score;
20:                 sensor_poses = new_poses;
21:             }
22:         } while updated_score < previous_score;
23:         do {
24:             new_voxel_space = change_resolution(voxel_space, voxel_size, sensor_data);
25:             project(sensor_poses, sensor_data, new_voxel_space);
26:             score = total_residual(new_voxel_space, Eigenvalue_decomp);
27:             block_transform = anxious_search(sensor_poses, sensor_data, new_voxel_space);
28:             new_voxel_space = change_resolution(voxel_space, voxel_size, sensor_data);
29:             new_poses = generate_poses(sensor_poses, block_transform);
30:             project(new_poses, sensor_data, new_voxel_space);
31:             updated_score = total_residual(new_voxel_space, Eigenvalue_decomp);
32:             if (updated_score < score) {
33:                 sensor_poses = new_poses;
34:             }
35:         }while updated_score < previous_score;
36:     }
37:     return sensor_poses;
```

Position Measurement Error

In some examples, the calibration computing device may perturb sensor poses from a collective group of sensors on the vehicle (collective sensor data). In such examples, the calibration computing device may determine whether there is a position error. As in the calibration procedure described in detail above, an anxious search may be used to determine a position measurement error between two or more datasets. As with calibration, such a process may comprise looping over multiple voxel resolutions, from a coarse discretization to a fine discretization. For each discretization (or resolution), an anxious search may be performed to determine a block transform of one or more sensors which minimizes the total residual, using the Eigenvalue decomposition calculation. The resulting block transform from the original pose may correspond to an error in position measurement. As a non-limiting example, one or more of a position or orientation may be continuously estimated using an algorithm, such as, for example, a Bayesian filter (such as a Kalman filter), bundle adjustment, SLAM, or the like, which utilizes one or more sensors such as, but not limited to, LIDAR(s),

TABLE 4

Algorithm 3 Measurement Position Error

```
1:  procedure position_error(origin_pose, voxel_space, sensor_data)
2:      pose ← origin_pose;
3:      voxel_sizes ← [5, 10, 20, 40];
4:      fraction ← 0.8;
5:      lowest = total_residual(voxel_space, Eigenvalue_decomp);
6:      foreach voxel_sizes (in ascending order):
7:          new_voxel_space = change_resolution(voxel_space,
                  voxel_size);
8:          new_pose = anxious_search(pose, sensor_data,
                  new_voxel_space);
9:          project(sensor_data, new_pose, new_voxel_space);
10:         residual = total_residual(new_voxel_space,
                  Eigenvalue_decomp);
11:         if (residual < fraction*lowest) {
12:             lowest ← residual;
13:             pose ← new_pose;
14:     return get_transform(pose, origin_pose);
```

Interest Region

In some examples, the calibration computing device may determine that the vehicle passed through a region of interest, and may gather data captured in the region of interest. The calibration computing device may determine a voxel score (i.e. a total residual). The calibration computing device may compare the voxel score for the designated voxel space to an expected voxel score for the region of interest. If the actual voxel score substantially matches, the voxel score associated with the region of interest, the calibration computing device may verify the calibration of the one or more sensors. If the actual voxel score is higher than the voxel score associated with the region of interest, the calibration computing device may determine that one or more of the sensors is out of calibration. For example, a calibration computing device may determine that a voxel score associated with a region of interest is 0.3. The calibration computing device may capture data as the vehicle passes through the region of interest, and may calculate an actual voxel score of 0.8. The calibration computing device may determine, based on the difference between the expected voxel score and the actual voxel score, that the particular sensor is out of calibration.

In some examples, responsive to the determination that the sensor is out of calibration, the calibration computing device may take the uncalibrated sensor offline (e.g., turn the sensor off, ignore data received from the sensor, etc.). Additionally, the calibration computing device may recalibrate the sensor using the anxious search technique.

In various examples, the calibration computing device may be configured to use sensor data to accurately correct drift in a position and/or orientation of the vehicle. In such examples, the correction may be based on a reference position and/or orientation of the vehicle. In various examples, the calibration computing device may receive first collective sensor data at a reference position and may project the first collective sensor data into a voxel space. The calibration computing device may receive an indication, such as from one or more motion sensors and/or one or more location sensors (e.g., global positioning system (GPS) sensor, inertial navigation system (INS) sensor, etc., and/or output of various algorithms, such as, but not limited to, Kalman filters, bundle adjustment, SLAM, etc. which take as input one or more LIDAR(s), RADAR(s), etc.), that the vehicle has returned to the reference position. The calibration computing device may receive second collective sensor data at the reference position and may project the second collective sensor data into the voxel space along with the first collective sensor data.

The calibration computing device may minimize a cost function of voxel occupancy, and aggregate voxel distribution statistics. The calibration computing device may then perturb the second collective sensor data relative to the first collective sensor to optimize (e.g., sharpen the image) using the anxious search technique. The calibration computing device may estimate the error in the position (e.g., delta transform) from the first pass in which the first collective sensor data was captured, to the second pass in which the second collective sensor data was captured. The calibration computing device may apply the delta transform to the positioning data (e.g., data from the motion sensors and/or navigation sensors), to accurately localize the vehicle.

The methods, apparatuses, and systems described herein can be implemented in a number of ways. Example implementations are provided below with reference to the following figures. Although discussed in the context LIDAR data and/or in the context of an autonomous vehicle, the methods, apparatuses, and systems described herein can be applied to a variety of systems utilizing machine vision. Further, although primarily described in connection with LIDAR data, the methods, apparatuses, and systems described herein are not limited to LIDAR data. For example, the methods, apparatuses, and systems may be utilized in a manufacturing assembly line context, or in an aerial surveying context. Further, the datasets may include data from stereoscopic cameras, depth cameras, RADAR sensors, acoustic sensors, etc.

FIG. 1 illustrates an example environment 100 in which a sensor calibration and localization system can be used. A vehicle 102 may operate in the environment 100, such as by driving along a path 104. The vehicle 102 may include a fully autonomous, semi-autonomous, or manned vehicle. In some examples, the vehicle may be an autonomous vehicle configured to operate according to a Level 5 classification issued by the U.S. National Highway Traffic Safety Administration, which describes a vehicle comprising an operational control system capable of performing all safety-critical functions for the entire trip, with the driver (or occupant) not being expected to control the vehicle at any time. In such examples, since the vehicle 102 may be configured to control all functions from start to stop, including all parking functions, it may be unoccupied.

As illustrated in FIG. 1, the vehicle 102 may be a bidirectional vehicle. In such examples, the autonomous bidirectional vehicle may operate and/or appear substantially symmetrically when operating in what would be either of a forward or reverse direction in a traditional vehicle. The example vehicle 102 shown in FIG. 1 is an automobile having a body (e.g., a body, a frame, or a combination thereof), four wheels, and respective tires for each of the wheels. Other types and configurations of vehicles are contemplated, such as, for example, vans, sport utility vehicles, cross-over vehicles, trucks, buses, agricultural vehicles, construction vehicles, aerial vehicles, or the like. The vehicle 102 may be powered by one or more internal combustion engines, one or more electric motors, hydrogen power, any combination thereof, and/or any other suitable power sources.

In various examples, the vehicle 102 may include a computing system 106 configured to process data from one or more sensors to operate the vehicle 102 to perform a variety of tasks or functions (e.g., navigation, guidance, obstacle avoidance, etc.). The sensor(s) may include image capture devices (e.g., RGB cameras, intensity cameras, IR cameras, stereo cameras, depth cameras, etc.), motion sensors (e.g., rotary (wheel) encoders, inertial measurement units (IMU) sensors, etc.), light detection and ranging (LIDAR) sensors, radio detection and ranging (RADAR) sensors, sound navigation and ranging (SONAR) sensors, global positioning system (GPS) sensor, inertial navigation system (INS) sensors, microphones, accelerometers, gyroscopes, magnetometers, environmental sensors (e.g., ambient temperature gauge, road surface temperature gauge, humidity sensor, and barometric pressure sensor, etc.), and/or other types of sensors for operating and/or controlling the vehicle 102.

In various examples, to assist in operating the vehicle 102, the computing system 106 may be communicatively coupled to one or more remote computing devices, such as the calibration/localization server 108. In such examples, the computing system 106 may be configured to send and receive data to and from the calibration/localization server 108 via a network 110. The network(s) 110 can include public networks such as the Internet, private networks such as an institutional and/or personal intranet, or some combination of private and public networks. The network(s) 110 can also include any type of wired and/or wireless network, including but not limited to local area networks (LANs), wide area networks (WANs), near field communication (NFC), satellite networks, cable networks, Wi-Fi networks, WiMax networks, mobile communications networks (e.g., 3G, 4G, and so forth), or any combination thereof. The network(s) 110 can utilize communications protocols, including packet-based and/or datagram-based protocols such as internet protocol (IP), hypertext transfer protocol (HTTP), hypertext transfer protocol secure (HTTPS), transmission control protocol (TCP), user datagram protocol (UDP), or other types of protocols. Moreover, network(s) 110 can also include a number of devices that facilitate network communications and/or form a hardware basis for the networks, such as switches, routers, gateways, access points, firewalls, base stations, repeaters, backbone devices, and the like.

In some examples, the network(s) 110 can further include devices that enable connection to a wireless network, such as a wireless access point (WAP). The examples which support connectivity through WAPs send and receive data over various electromagnetic frequencies (e.g., radio frequencies), including WAPs that support Institute of Electrical and Electronics Engineers (IEEE) 802.11 standards (e.g., 802.11g, 802.11n, and so forth), and other standards.

In various examples, the calibration/localization server 108 can include server devices 112(1)-112(N). Embodiments support scenarios where server device(s) 112 may include one or more computing devices that operate in a cluster or other grouped configuration to share resources, balance load, increase performance, provide fail-over support or redundancy, or for other purposes. Server device(s) 112 may belong to a variety of categories or classes of devices such as traditional server-type devices, desktop computer-type devices, mobile devices, special purpose-type devices, and/or embedded-type devices. Thus, although illustrated as desktop and laptop computers server device(s) 112 can include a diverse variety of device types and are not limited to a particular type of device. Server device(s) 112 may represent, but are not limited to, desktop computers, server computers or blade servers such as web-servers, map-reduce servers, or other computation engines or network-attached storage units, personal computers, mobile computers, laptop computers, tablet computers, or any other sort of computing device. Further, though illustrated in a single location in FIG. 1, the server device(s) need not reside in a single location.

In various examples, the computing device 106 may be configured to calibrate and/or verify a calibration of one or more LIDAR sensors 114 on the vehicle 102, such as when the vehicle is in an online mode. In such examples, the computing device 106 may be configured to determine real-time calibration of the one or more LIDAR sensors 114. In some examples, the calibration/localization server 108 may be configured to calibrate LIDAR sensors 114 on the vehicle 102. In such examples, the calibration/localization server 108 may receive sensor data from the computing device 106, and may determine a calibration of the one or more LIDAR sensors 114. Because the computing device 106 and the calibration/localization server 108 may be configured to calibrate the LIDAR sensor(s), both may be referred to hereinafter as a calibration computing device. Further, though illustrated as separate components, the calibration/localization server 108 and the computing device 106 may be a single device.

In various examples, the calibration computing devices 106 and 108 may include a trajectory module 116 that is configured to receive data from one or more sensors (e.g., depth sensors, such as LIDAR(s), RADAR(s), etc., image sensors, such as camera(s) etc., motion sensors, such as inertial measurement units (IMU) sensors, accelerometers, gyroscopes, rotary (wheel) encoders, etc., navigation sensors, such as global positioning system (GPS) sensor, INS sensor, etc.) of the vehicle 102. The trajectory module 116 may determine trajectory data of the vehicle 102 using the data from the sensor(s). The trajectory data may include a speed, direction, pitch, roll, yaw, and/or rates thereof.

In various examples, the trajectory module 116 may identify a central location of a region of interest 118 based at least in part on the trajectory data. In some examples, the central location may be determined based on a yaw rate of the vehicle 102 at a given time (t). In some examples, the central location may be determined based on a radius of curvature (r) of the path 104. In some examples, the central location may be determined based on a position and/or a speed of the vehicle 102 at the given time (t).

In various examples, the trajectory module 116 may determine the region of interest 118 by generating a time window centered on the central location. In such examples, the time window may include a number of seconds before the central location (t−x) and a number of seconds after the central location (t+x). In various examples, the number of seconds (x) may be a fixed number of seconds. In some examples, the number of seconds (x) may be based on the trajectory data, such as the speed of the vehicle 102.

In various examples, the calibration computing devices 106 and 108 may include a calibration module 120 configured to calibrate one or more LIDAR sensors 114. In some examples, the calibration module 120 may receive region of interest 118 data from the trajectory module 116. In such examples, the region of interest 118 data may include a central location and a time window (i.e., (t−x)→(t+x)) associated with the region of interest 118. The calibration module 120 may be configured to filter LIDAR data captured by the LIDAR sensor(s) 114 during the time window to determine a LIDAR dataset for calibration. Additionally, or in the alternative, such a calibration module 120 may perform any one or more of a search (such as, but not limited to, an anxious search), a calibration, or a measurement position error determination, as discussed in detail herein.

In some examples, a higher residual value for a voxel may correspond to LIDAR data that is out of alignment or that is uncalibrated with respect to other LIDAR sensors. For example, if a distance between LIDAR data for a selected sensor in a voxel and a plane determined by data associated with other LIDAR sensors in the voxel is high, the residual score associated therewith may be high, indicating the data associated with the selected sensor is out of alignment.

In various examples, a single LIDAR sensor 114 may be calibrated. In such examples, the perturbations described above may be performed on sensor data from the single LIDAR sensor 114, while leaving the sensor data from the other sensors constant. In some examples, the perturbations may be performed on the collective sensor data (e.g., metaspin). In some examples, the sensor data from each of the LIDAR sensors 114 may be perturbed simultaneously. In such examples, the perturbations may be performed in parallel on one or more graphical processing units.

The calibration module 120 may continue perturbing the sensor data until the residual value for each voxel, and consequently the total residual, is optimized. An optimization may include a minimization or a maximization of the total residual. As a non-limiting example, such a optimization may be accomplished using, for example, an anxious search. In various examples, calibration module 120 may determine the residual value is optimized based on a determination that one or more perturbations increases the residual value. In some examples, the calibration module 120 may determine the residual value is optimized based on a determination that one or more perturbations do not substantially change (i.e., increase or decrease) the residual value. In some examples, a substantial reduction may include a reduction greater than a threshold reduction value.

In various examples, the calibration module 120 may be configured to verify the calibration of one or more sensors. In some examples, the verification may be performed periodically, such as every hour, every day, once per week, etc. In some examples, the verification may be performed based on an indication that one or more LIDAR sensors 114 may be out of alignment. For example, the calibration module 120 may receive an indication that a passenger entering the vehicle 102 brushed up against a LIDAR sensor 114, and may have adjusted a physical position of the LIDAR sensor 114. Responsive to the indication, the calibration module 120 may verify the calibration and/or re-calibrate the sensor.

In some examples, the calibration module 120 may take an affected LIDAR sensor 114 offline during verification and/or re-calibration. In such examples, the sensor data captured by the affected LIDAR sensor 114 may not be processed by an operational control system of the vehicle 102. In other words, should the affected LIDAR sensor 114 be out of alignment, the data received therefrom may not negatively impact the operation of the vehicle 102. In some examples, the calibration module 120 may leave the affected LIDAR sensor 114 online during verification and/or re-calibration.

To verify the calibration of a LIDAR sensor 114, the calibration module 120 may identify data associated with a region of interest 118. In some examples, the calibration module 120 may use the data associated with the region of interest 118 to calculate a residual value corresponding to each occupied voxel in the voxel space. In some examples, the calibration module 120 may compare the current residual value to the initial calibration residual value for each voxel in the voxel space. In some examples, the calibration module 120 may calculate a current voxel space residual value by adding residual scores for the occupied voxels in the voxel space. In such examples, the calibration module 120 may compare the current voxel space residual value to a voxel space residual value corresponding to the initial calibration. In some examples, the calibration module 120 may compare current voxel scores for each value and/or a voxel space voxel score to the respective voxel scores corresponding to the initial calibration.

In various examples, the calibration module 120 may access a data store comprising residual values and/or voxel scores associated with a region of interest. In such examples, the calibration module 120 may compare the current residual values and/or voxel scores for data collected in a particular region of interest to the stored residual values and/or voxel scores corresponding to the particular region of interest.

In some examples, the calibration module 120 may determine that a LIDAR sensor 114 is out of calibration based on the current residual value and/or voxel score being a threshold value greater than the residual value and/or voxel score corresponding to the initial calibration. Responsive to a determination that a LIDAR sensor 114 is out of calibration, the calibration module 120 may re-calibrate the LIDAR sensor 114 using the techniques described above. For example, the calibration module 120 may determine that a current voxel score for a voxel space associated with a first region of interest is 0.41, and the stored voxel score for the voxel space associated with the first region of interest is 0.4. The calibration module 120 may determine that the current voxel score of 0.41 is less than a threshold amount above the stored voxel score of 0.4, and may verify the calibration of the LIDAR sensors 114. For another example, the calibration module 120 may determine that a current voxel score for a voxel space associated with a second region of interest is 0.7, and the stored voxel score for the voxel space associated with the second region of interest is 0.5. The calibration module 120 may determine that the current voxel score of 0.7 is greater than a threshold amount above the stored voxel score of 0.5. Based on the current voxel score being greater than a threshold amount above the stored voxel score, the calibration module 120 may determine that a LIDAR sensor 114 is out of calibration.

In various examples, the calibration computing device may include a localization module 122 configured to determine a position error (e.g., drift error) associated with the vehicle 102. As discussed above, the vehicle 102 may determine a position and/or a location using one or more sensors. The calibration computing device, such as via the trajectory module 116, may receive input from the one or more sensors, and may determine a position and/or orientation (e.g., positioning data) of the vehicle 102. In some examples, the trajectory module 116 may be configured to receive input from the one or more sensors and may determine an error in a trajectory of the vehicle 102. Over time in operation, errors may accumulate, resulting in errors in positioning and/or trajectory data. As will be discussed in greater detail below with respect to FIGS. 5 and 6, to correct the position errors and/or trajectory errors of a vehicle, the localization module 122 process LIDAR data captured at a reference point. In some examples, the reference point may include a pre-defined reference point on a route of the vehicle 102. In some examples, the reference point may include any point along a route of the vehicle 102 that will be passed twice while the vehicle 102 travels the route.

In some examples, the localization module 122 may cause the LIDAR sensors 114 to capture the collective sensor data responsive to an indication that the vehicle 102 is located at the reference point. In some examples, the localization module 122 may filter collective sensor data to process data captured at the reference point for at least two passes of the reference point. For example, the localization module 122 may receive an indication that the vehicle 102 is at the reference point on a first pass thereof. The localization module 122 may receive first collective sensor data corresponding to the first pass of the reference point, and may project the first collective sensor data into a voxel space. The localization module 122 may then receive an indication that the vehicle 102 is at the reference point on a second pass thereof. The localization module 122 may receive second collective sensor data corresponding to the second pass of the reference point, and may project the second collective sensor data into the voxel space.

In various examples, the localization module 122 may calculate a total residual of the voxel space. In various examples, the localization module 122 may optimize the voxel scores corresponding to each voxel. Such an optimization may be performed in accordance with any one or more of an anxious search, a calibration, or a measurement position error. In various examples, the localization module 122 may optimize the residual values by using anxious search techniques on a subsequently captured dataset (e.g., second collective data). In such examples, the localization module 122 may adjust one or more sensor poses of the subsequently captured dataset while keeping dimensions of the first collective data constant. Based on the adjustment, the localization module 122 may estimate the error in the position and/or orientation (e.g., delta transform) from the first pass in which the first collective sensor data was captured, to the second pass in which the second collective sensor data was captured. The localization module 122 may apply the delta transform to the positioning data (e.g., data from the one or more sensors), to accurately localize the vehicle.

Figure 2:
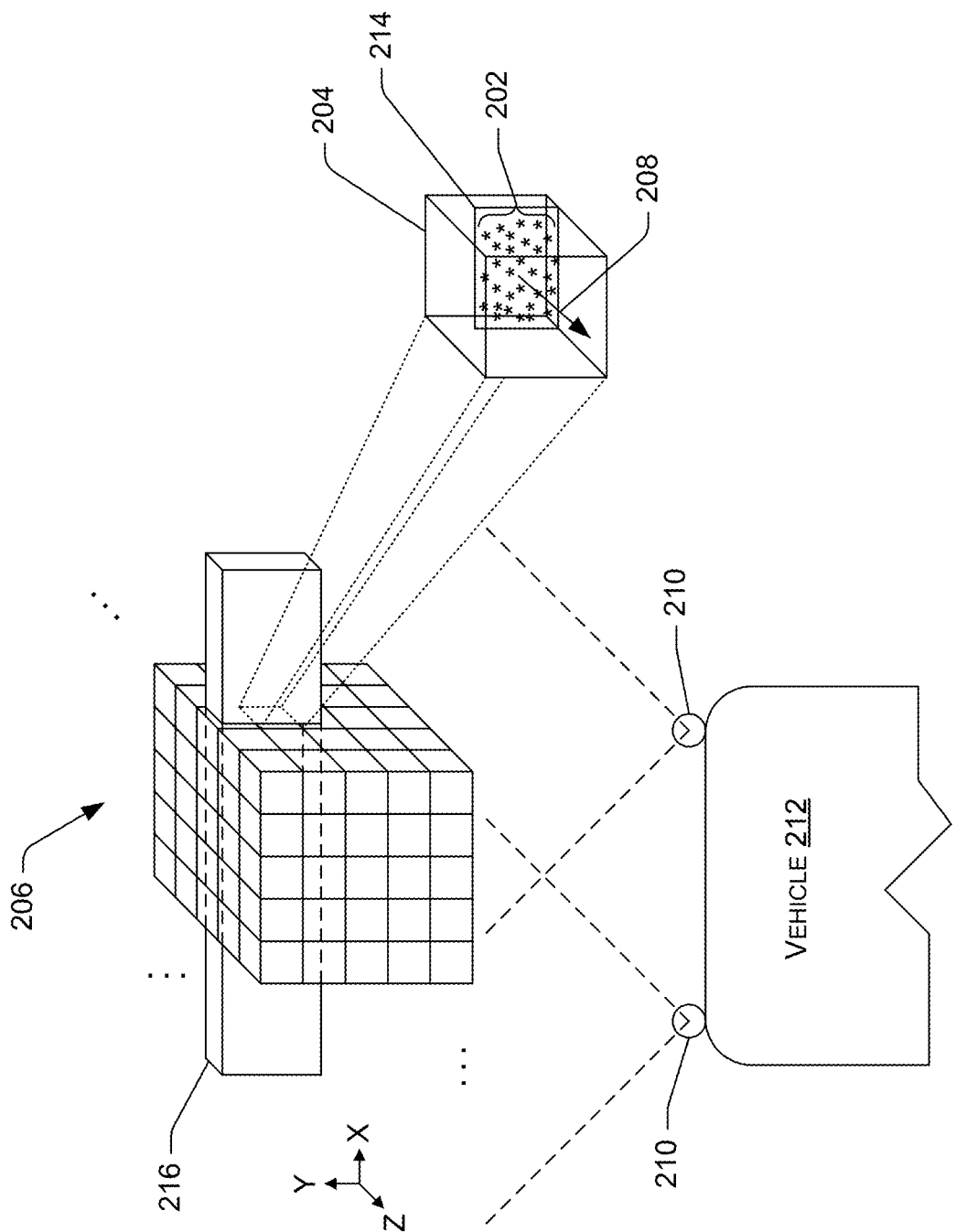
FIG. 2 is an example illustration of a LIDAR dataset projected into a voxel in a voxel space by the sensor calibration and localization system to calculate a residual value.

FIG. 2 is an example illustration 200 of a dataset 202 projected into a voxel 204 in a voxel space 206 by the sensor calibration and localization system to calculate a residual value 208 when performing a calibration. In various examples, a calibration computing device of the calibration and localization system may receive sensor data from one or more LIDAR sensors 210 on a vehicle 212. The calibration computing device may project the sensor data into the voxel space 206, represented as dataset 202. It should be noted that the dataset 202 is represented as multiple points for illustrative purposes only. Such points in the dataset 202 represent a statistical accumulation of one or more data points, as described in detail above.

In various examples, the calibration computing device may perform a search (e.g. an anxious search), perform a calibration, and/or determine a measurement position error. In some examples, the calibration computing device may determine a best-fit plane 214 for each voxel, as described in detail above. In such examples, the best-fit plane 214 may represent a portion of an object 216 detected by the LIDAR sensors 210.

Figure 3:
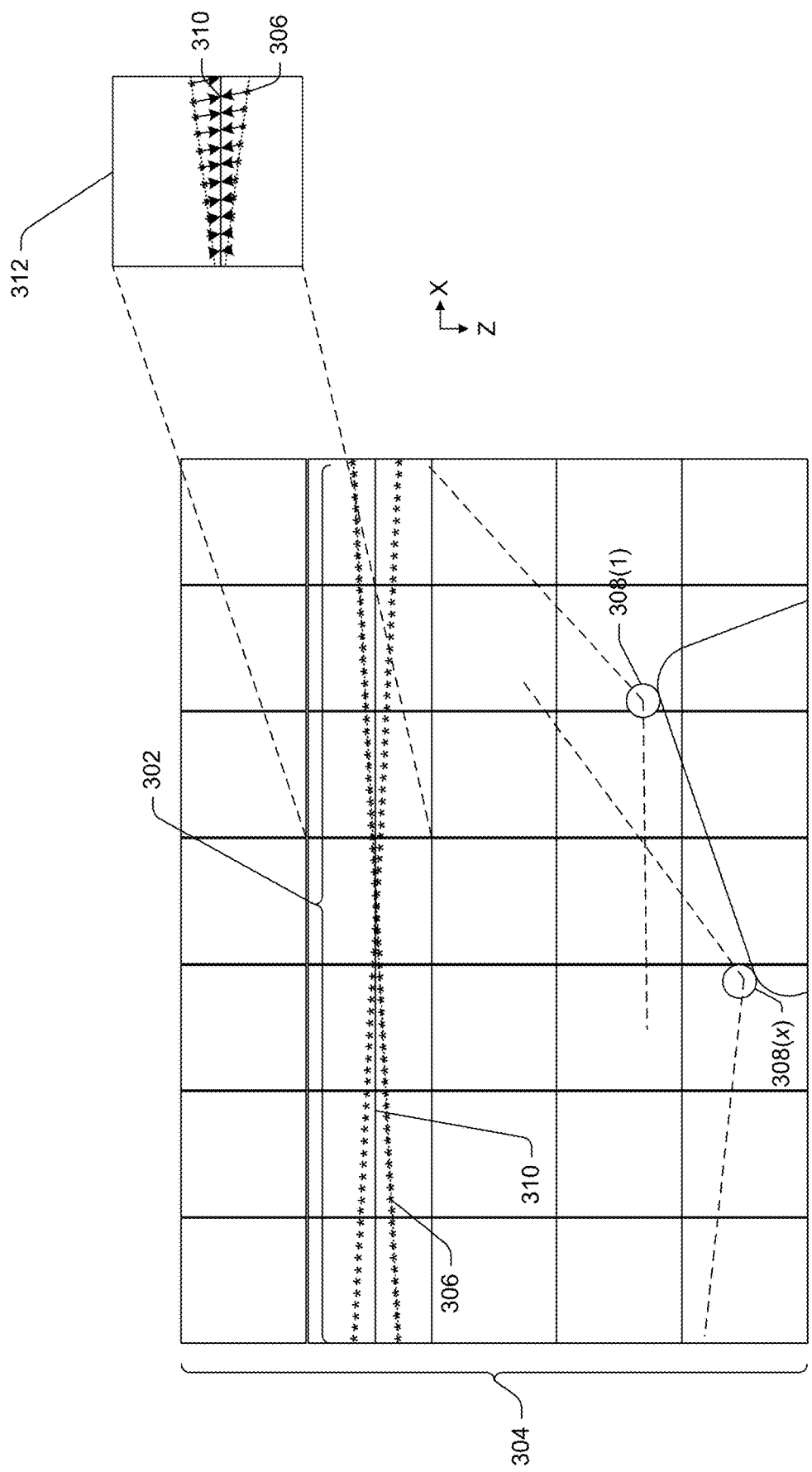
FIG. 3 is another example illustration of a LIDAR dataset projected into a voxel space by the sensor calibration and localization system to calculate a residual value.

FIG. 3 is another example illustration 300 of a dataset 302 projected into a voxel space 304 by the sensor calibration and localization as may be used in any of an anxious search, calibration, or determination of a measurement position error. The dataset 302 may include data points 306 captured by one or more sensors 308 (illustrated as sensors 308(1), 308(x)). Although depicted in FIG. 3 as multiple points, data points 306 are merely depicted for illustrative purposes. As described in detail above, only a statistical accumulation of data points 306 are stored in each voxel 312. In various examples, the sensor 308(1) may include a LIDAR sensor of a vehicle, such as vehicle 102. In some examples, the sensor 308(1) may comprise one of a plurality of LIDAR sensors 308(x) of the vehicle. For example, the sensor 308(1) may comprise one of eight (x=8) LIDAR sensors 308 on the vehicle.

In various examples, the calibration computing device may be configured to determine a plane 310 in each voxel 312, as described in detail above (e.g. by using an Eigenvalue decomposition or referencing a mesh from a previously generated map). In such examples, the plane 310 may represent an object detected by the sensors 308 other than sensor 308(1). For example, using the eight LIDAR sensor 308 example from above, the plane 310 may represent data from up to seven of the eight LIDAR sensors 308. In the illustrative example, the plane 310 spans a width of the voxel space 304. In other examples, the plane 310 may occupy fewer voxels, depending on the size of the object.

In various examples, the calibration computing device may calculate the residual value of each voxel 312 based on a distance of each data point 306 to the plane 310. Such a residual may be used, for example, in any one or more of an anxious search, calibration, or determination of measurement position error as defined herein.

Figure 4:
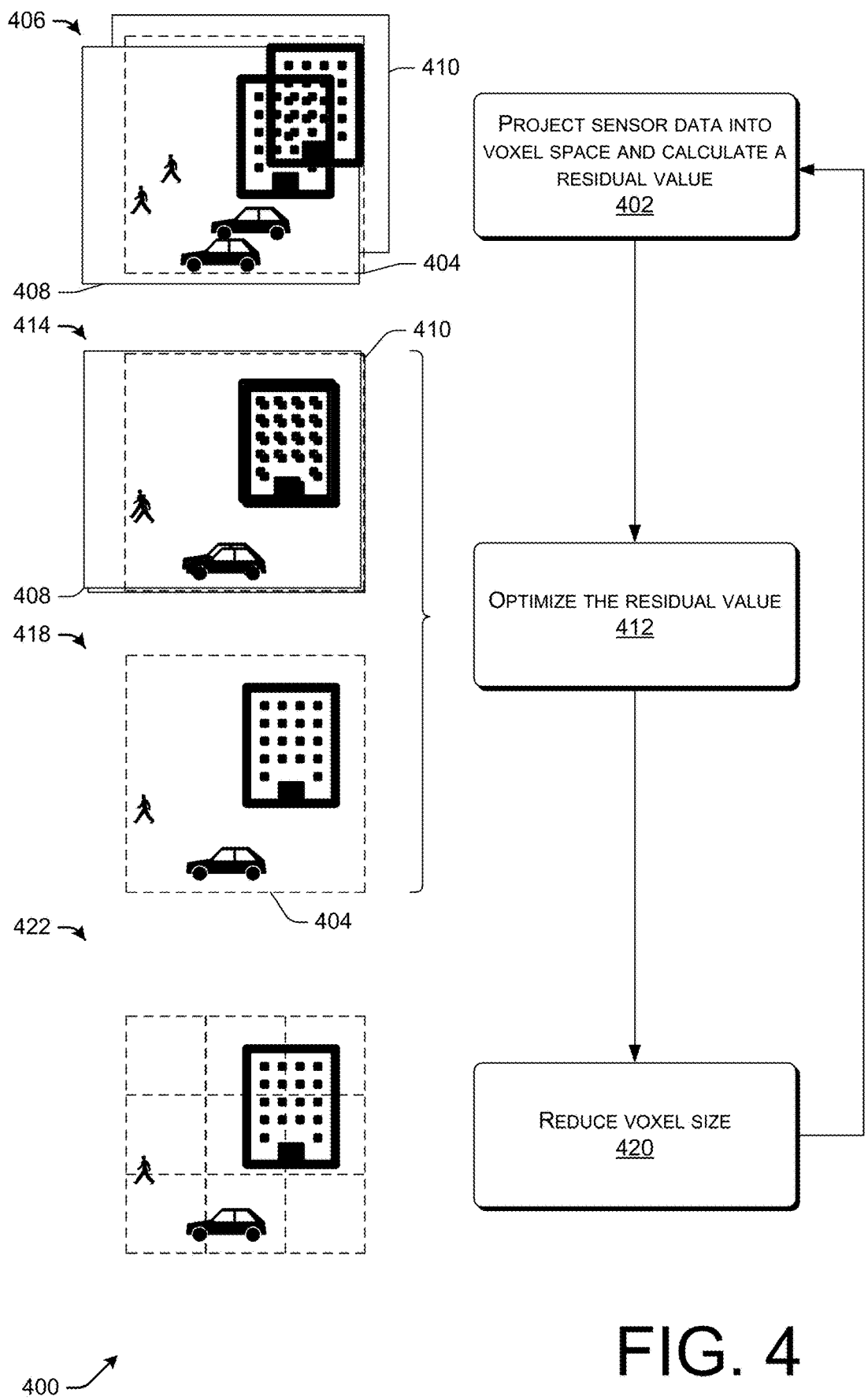
FIG. 4 illustrates a pictorial flow diagram of an example process for perturbing LIDAR datasets to calibrate LIDAR sensors and/or determine a position error of a vehicle.

FIG. 4 illustrates a pictorial flow diagram of an example process 400 for perturbing LIDAR datasets to calibrate LIDAR sensors and/or localize a vehicle. A calibration computing device may receive sensor data from one or more sensors. In some examples, the sensor data from each sensor may be referred to herein as a dataset.

At 402, the calibration computing device may project the sensor data into a voxel space 404 and calculate a residual value. In some examples, the residual value may be a residual value for each voxel in the voxel space 404. In some examples, the residual value may include a total residual value (e.g., residual value for the entire voxel space). Example 406 depicts a first dataset 408 and a second dataset 410 projected into a voxel space. For illustrative purposes, the objects captured in the first dataset 408 and the second dataset 410 are projected into a voxel. However, in other examples, the objects may be projected into two or more voxels of the voxel space 404. In the example 406, the first dataset 408 and the second dataset 410 are misaligned, representing a collective view of one or more uncalibrated sensors.

In some examples, the calibration computing device may calibrate a single sensor of the plurality of sensors. In such examples, the first dataset 408 may represent data captured by the single sensor, and the second dataset 410 may represent data captured by one or more other sensors. In some examples, the calibration computing device may calibrate multiple sensors simultaneously. In such examples, the first dataset 408 may represent data from a first sensor and the second dataset 410 may represent data from a second sensor.

At 412, the calibration computing device may optimize the residual value. In some examples, an optimization of the residual value may include applying transformations to the sensor (e.g., data source) and recalculating residual values based on the transformations. In some examples, the optimization may include a minimized (i.e., a smallest) residual value resulting from the transformations. In some examples, the optimization may include a maximized (i.e., a largest) residual value resulting from the transformation.

In various examples, with each transformation applied to the sensor, the calibration computing device may recalculate the residual value by reprojecting the data into the voxel space 404 and based on the new pose resulting from the transform, may calculate a new residual value. Example 414 illustrates a perturbation of the sensor data that results in an improved residual score (i.e., a lower residual score or a higher residual score, depending on the mathematical formula applied), and thus, a crisper image compared to example 406. In various examples, the calibration computing device may apply the transformations to the data source associated with the first dataset 408 while leaving the data source associated with the second dataset 410 constant. In some examples, the calibration computing device may apply the transform to the data source associated with the first dataset 408 and the second dataset 410 simultaneously. In such examples, the transformation may be performed in parallel, such as by a graphical processing unit.

In some examples, the calibration computing device may optimize the residual value by performing an anxious search on the first dataset 408 and/or the second dataset 410. In such examples, and as described above, the anxious search may comprise a number of magnitudes and a number of search directions. Once a set of search directions and magnitudes are determined, the anxious search may iterate through any one or more combinations of the search directions and magnitudes to determine an optimal transform, thereby optimizing the residual value.

In some examples, the optimization may include applying transformations of different magnitudes and/or search directions to the data source until any further transformations result in a higher voxel value. In some examples, the optimization may include applying transformations of different magnitudes and/or search directions to the data source until the transformations result in a minimal change in voxel value. In some examples, the minimal change may include a pre-defined threshold differential in the residual values. The crisp image illustrated in example 418 represents an optimized voxel value for the voxel space 404.

At 420, the calibration computing device may reduce the voxel size of each voxel in the voxel space 404. Additionally, the calibration computing device may increase a number of voxels which populate the voxel space 404. In some examples, the calibration computing device may reduce the voxel size by one-half. In other examples, the calibration computing device may reduce the voxel size by a greater or lesser amount. Example 422 illustrates a first iteration of a voxel size reduction, with the voxels size being reduced by one-half.

In various examples, after a first iteration of reducing the voxel size, the calibration computing device may repeat operations 402, 412, 416, and 420, re-calculate residual values for each voxel in the voxel space 404, applying transformations to one or more sensors and re-calculating residual values, optimizing residual values and reducing the voxel size. In some examples, the calibration computing device may continue the iterations until the voxel size is reduced to a predetermined size. In some examples, the calibration computing device may perform a fixed number of iterations. In at least one example, the initial voxel size may include an 8 m cube, and the calibration computing device may perform six iterations until the voxel size is a 0.25 m cube.

Figure 5:
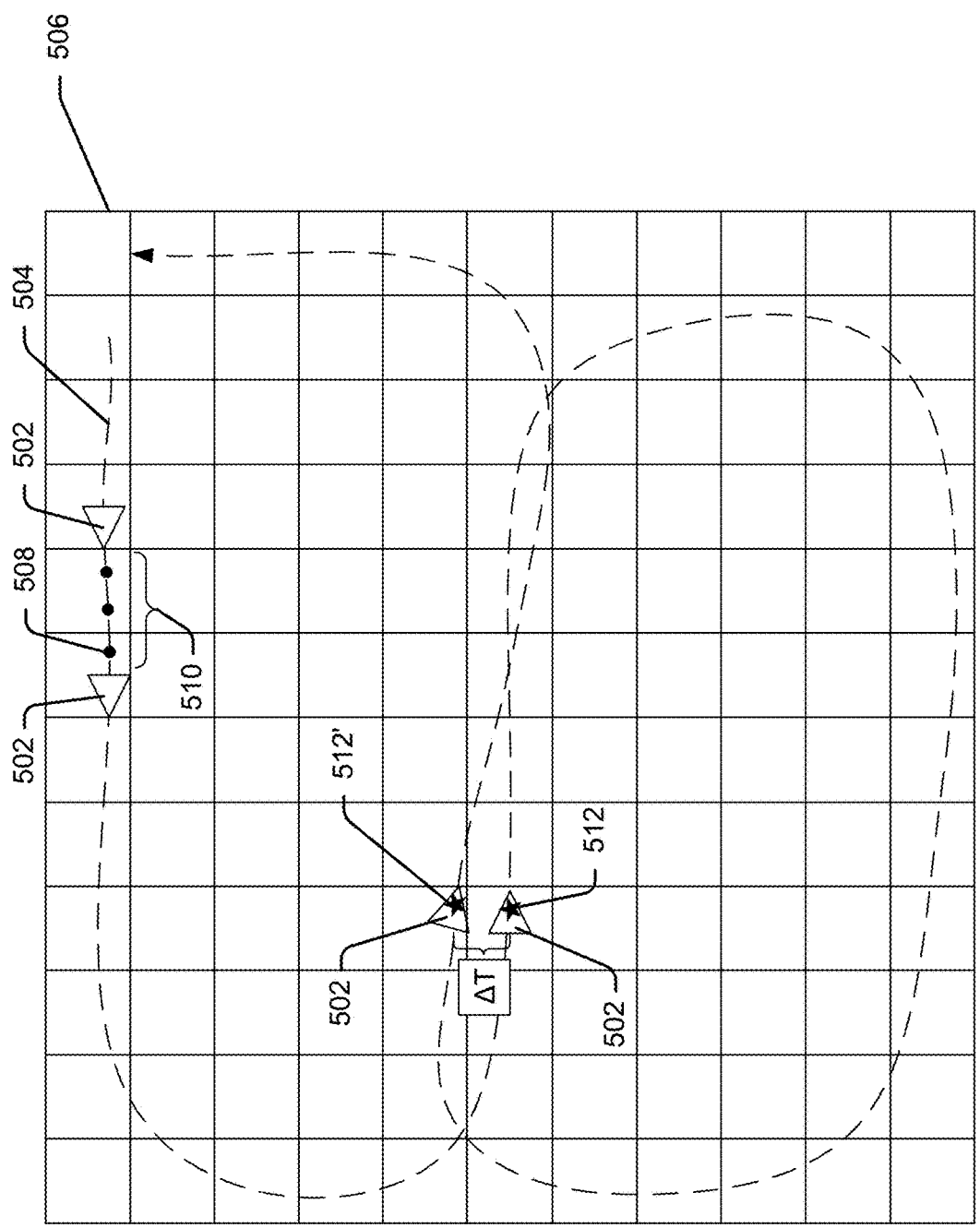
FIG. 5 is an aerial view of an example environment in which a localization system can be used.

FIG. 5 is an aerial view of an example environment 500 in which a localization system can be used. In various examples, a vehicle 502 can drive a path 504. In the illustrative example, the path 504 is in the shape of a figure-8. In other examples, the path 504 may include another shape, such as a circle, an oval, or any other shape which may result in the vehicle 502 passing a same location more than once. As illustrated, the path 504 may traverse across a grid 506. In various examples, the grid 506 may include a two-dimensional representation of a voxel space, such as the voxel space described herein. In some examples, the grid 506 may include a representation of a road surface.

An operational control system of the vehicle may navigate (e.g., determine a trajectory and speed) the vehicle 502 along the path 504. In some examples, a calibration computing device configured to determine position errors may comprise part of the operational control system. In other examples, the calibration computing device may be separate from the operational control system, and may be configured to augment the operational control system.

In various examples, the calibration computing device may receive input from one or more sensors to determine a location 508 of the vehicle 502 along the path 504 at a given time. The calibration computing device may process the input into a perceived trajectory. In some examples, the perceived trajectory may be a smooth (e.g., velocity integrated) trajectory.

As illustrated in FIG. 5, the input from the one or more sensors may be received at a fixed interval 510. The fixed interval 510 may include an input interval determined to prevent "tears" or other perceived path deviations in the perceived trajectory. In some examples, the inputs may be limited based on required computing power to process the data, a time required to receive a signal, or the like. For example, the calibration computing device may receive input from the sensor(s) at the fixed interval 510 of 200 Hz. The 200 Hz constraint on the input may prevent deviations in the input trajectory, thereby resulting in a smooth perceived trajectory.

Though the constraint on the inputs may result in a smooth perceived trajectory, the inputs may include errors in the location 508 at a given time. In some examples, the errors (e.g., drift errors, trajectory errors, etc.) may be caused by errors associated with the navigation sensors, such as errors caused by incorrect or multipath GPS data. In some examples, the errors may be caused by errors associated with the motion sensors. For example, inertial measurement units may accumulate errors over time, e.g. due to sensor drift.

In various examples, the calibration computing device may be configured to use sensor data to accurately correct drift in a position and/or orientation of the vehicle and/or errors in trajectory data associated with a movement of the vehicle 502. In some examples, the correction may be based on a reference position 512 of the vehicle 502. Additionally, the correction may be based on an orientation of the vehicle 502 at the reference position 512.

In various examples, the calibration computing device may receive first collective sensor data (e.g., sensor data from vehicle perception sensors, such as LIDAR sensors) at the reference position 512, and may project the first collective sensor data into a voxel space. In some examples, the calibration computing device may cause the first collective sensor data to be captured by the vehicle perception sensors at the reference position 512. In some examples, the calibration computing device may filter the first collective sensor data from a plurality of sensor data based on a time that the vehicle location 508 corresponds to the reference position 512.

The vehicle 502 may continue along the path 504 and receive an indication from the one or more sensors that the vehicle 502 has returned to the reference location 512'. The calibration computing device may receive second collective sensor data at the reference position 512', and may project the second collective sensor data into the voxel space along with the first collective sensor data.

As will be discussed in greater detail below with respect to FIG. 6, the calibration computing device may compare the first collective sensor data to the second collective sensor data to determine an error in positioning data (ΔT) from reference position 512 to reference position 512'.

In various examples, the calibration computing device may be configured to identify one or more dynamic objects in the voxel space. In some examples, the calibration computing device may identify the dynamic object(s) by comparing the first collective sensor data to the second collective sensor data. In such examples, an object that is represented in the first collective sensor data, such as those occupying at least one voxel of the voxel space, but not represented in the second collective sensor data, may be classified as a dynamic object.

In some examples, the calibration computing device may be configured to capture a third collective sensor data a short time (e.g., 1 second, 2 seconds, etc.) after capturing the first collective sensor data. In such examples, the calibration computing device may project the first collective sensor data and the third collective sensor data into the voxel space, and may compare objects represented in each voxel of the voxel space. Objects identified in a first set of voxels in the first collective sensor data and a second set of voxels in the second collective sensor data may be classified as dynamic objects.

In various examples, the calibration computing device may be configured to filter dynamic objects out of the voxel space prior to comparing the first collective sensor data to the second collective sensor data to determine an error in positioning data ($\Delta T$) from reference position 512 to reference position 512'.

Figure 6:
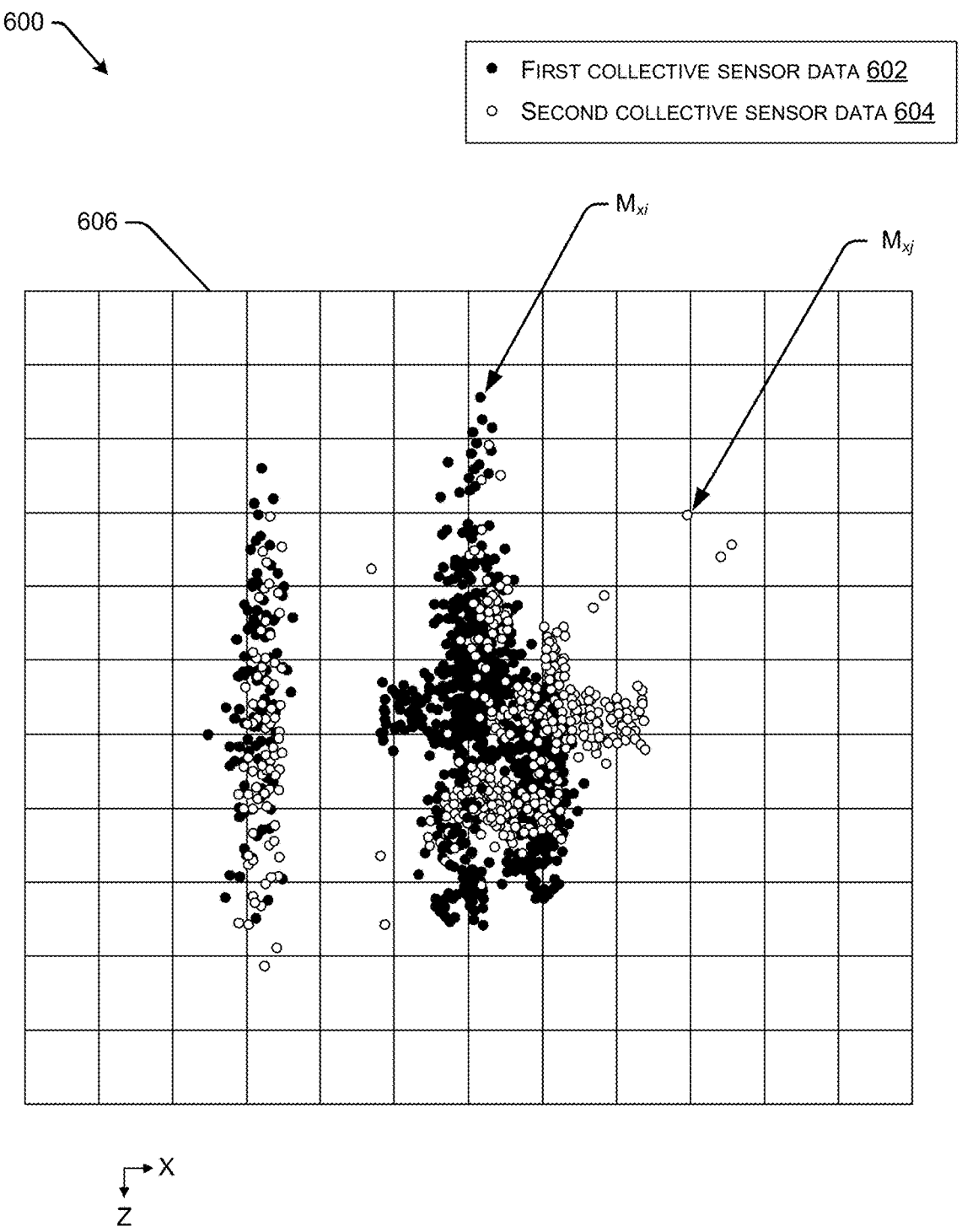
FIG. 6 is an example illustration of a first collective sensor data and a second collective sensor data used by a localization system to determine a position error of a vehicle.

FIG. 6 is an example illustration 600 of the first collective sensor data 602, captured at a first time, and the second collective sensor data 604, captured at a second time, projected into a voxel space 606. In various examples, the calibration computing device may minimize a cost function (e.g., occupancy score) of voxel occupancy. In such examples, the cost function may include an occupancy of the voxel multiplied by a penalty for occupancy. The penalty may represent a minimum cost for having a data point in a voxel. The cost function minimization may be represented by the following equation:

$$\underset{T}{\operatorname{argmin}} f(M_{x_i}, g(T, M_{x_j})), \quad (3)$$

where T represents a rigid six-degree of freedom (6-DOF) transform, by which the cost function is parameterized.

In various examples, the calibration computing device may then aggregate voxel distribution statistics. The calibration computing device may calculate a voxel score for each voxel, such as by adding an occupancy score and a residual value for each voxel. The calibration computing device may sum the scores for each voxel in the voxel space 606 to determine an aggregated score associated with the first collective sensor data 602 and the second collective sensor data 604 as captured.

After determining the aggregated score, the calibration computing device may optimize the data (e.g., minimize the aggregated score) by perturbing the second collective sensor data 604 relative to the first collective sensor to sharpen the image. The calibration computing device may use the anxious search technique described above with regard to FIG. 4 to optimize the data. In other words, the calibration computing device may adjust one or more dimensions of the second collective sensor data 604 until the second collective sensor data 604 substantially matches the first collective sensor data 602 in a crisp image, such as that depicted in example 418 of FIG. 4.

In some examples, the calibration computing device may adjust two dimensions of the X, Y, Z, and pitch, roll, yaw, to determine a lowest aggregated score. In some examples, the calibration computing device may adjust all three dimensions of the X, Y, Z and pitch, roll, yaw to determine a lowest aggregated score. Based on the adjustments that result in the minimized aggregated score, the calibration computing device may estimate the error in the position (e.g., delta transform) from the first pass in which the first collective sensor data 602 was captured (illustrated as reference position 512 in FIG. 5), to the second pass in which the second collective sensor data 604 was captured (illustrated as reference position 512' in FIG. 5). The calibration computing device may apply the delta transform to the positioning data (e.g., data from the motion sensors and/or navigation sensors), to accurately localize the vehicle.

FIGS. 7-11 are flow diagrams of example processes 700, 800, 900, 1000, and 1100 illustrated as a collection of blocks in a logical flow graph, which represent a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes.

Figure 7:
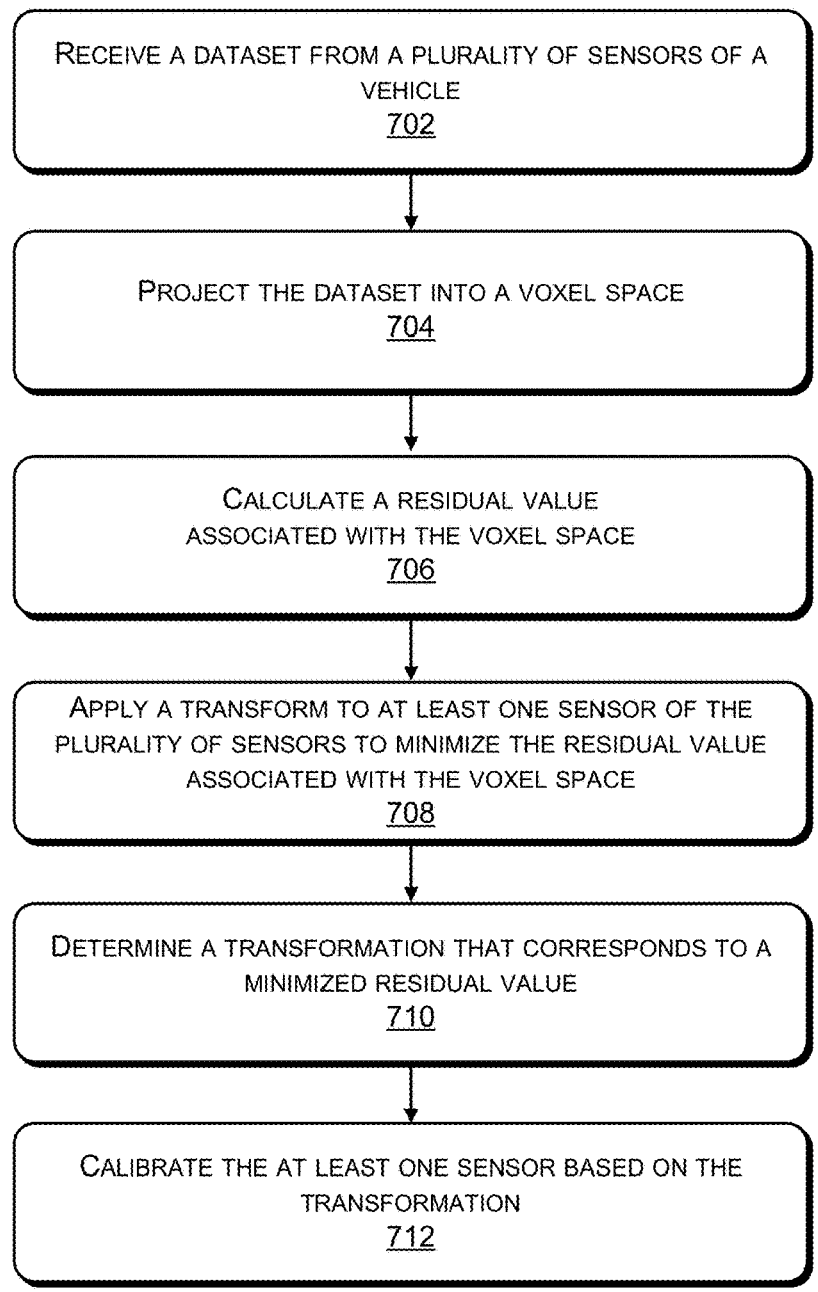
FIG. 7 is a flow diagram of an illustrative process for calibrating a sensor of a vehicle.

FIG. 7 is a flow diagram of an illustrative process 700 for calibrating a sensor of a vehicle, such as vehicle 102, as performed by a calibration computing device. As discussed above, the calibration computing device may be a vehicle computing device, such as vehicle computing device 106, or a server device associated with a calibration/localization server, such as calibration/localization server 108.

At 702, the calibration computing device receives a dataset from a plurality of sensors of the vehicle. In some examples, the plurality of sensors may include a plurality of LIDAR sensors. In other examples, the plurality of sensors may include a plurality of SONAR sensors, RADAR sensors, cameras, or the like.

At 704, the calibration computing device projects the dataset into a voxel space. In some examples, the voxel space can include a fixed, three-dimensional grid of an environment.

At 706, the calibration computing device calculates a residual value associated with the voxel space. In some examples, the calibration computing device may calculate the residual value based on a determination that a number of points in a voxel is above a threshold number (e.g., 5). In various examples, the residual value may include the a smallest eigenvalue, such as that calculated using a principal component analysis on the voxel. In some examples, the residual may be computed as the distance between an average position to a plane. In such examples, the plane may be calculated based on similar methods as above. Additionally, or in the alternative, the plane may be derived from a previous calculation and/or based at least in part on a 3D mesh provided of the environment. In those examples, where the number of points is below the threshold, an occupancy penalty may be imposed on that voxel by assigning the residual of that voxel a maximum value and identifying that voxel as "invalid." In some examples, the maximum value may be one or more of a length, width, height, or diagonal of the voxel.

Additionally, or in the alternative, each voxel that has at least one data point may be associated with a maximum occupancy score. As a non-limiting example, such an occupancy score may be the maximum residual value, though any other value is contemplated. Those voxels in which the number of points is zero may have an occupancy score of 0.

At 708, the calibration computing device applies a transform to at least one sensor of the plurality of sensors to minimize the residual value associated with the voxel space. In some examples, the calibration computing device may use an anxious search technique to minimize the residual value. By applying a transform (i.e. one or more of a translation or a rotation) to the data source (e.g. the sensor) and re-projecting the data into the voxel space based on the new sensor pose, a new total residual may be calculated. As described in detail herein, such an anxious search determines a transformation to apply to a data source which minimizes the total residual.

To find such a transform, the anxious search may comprise a number of magnitudes and a number of search directions. In some examples, there may be 26 search directions for a translational component (i.e. a +1, 0, −1 for each translational component, excluding the search direction where there is no translation). Additionally, or in the alternative, 26 additional search directions for a rotational component (i.e., pitch, roll, yaw) may be similarly determined. In some examples, there may be $3^6-1$ search directions corresponding to all possible combinations of a +1, 0, or −1 movement in any of the translation or rotation components (excluding where there is no movement). In some examples, the magnitudes may be a predefined set (e.g. {0.25 m, 0.5 m, 1 m, 2 m, 4 m, 8 m}). In other examples, the magnitudes may correspond to a number of scalar multiples of a single magnitude.

Once a set of search directions and magnitudes are determined, the anxious search may iterate through any one or more combinations of the search directions and magnitudes to determine an optimal transform to minimize the residual value. Such a search may proceed as follows. An original total residual may be calculated. Each search direction may then be scaled by each magnitude in the set of magnitudes. A transformation may be determined based on each of the scaled search directions. For each transformation, the sensor may be transformed from the original pose and the sensor data may be subsequently re-projected into the voxel space based at least in part on the new sensor pose. Based on the re-projected sensor data, a new total residual is calculated. In examples in which the lowest total residual is not lower than some percentage of the original total residual, the original pose is not altered. In various examples, the calibration computing device may continue to apply transformations to the data until the residual value of the voxel and/or voxel space is minimized. A minimized residual value may correspond to a lowest residual value for the voxel and/or the voxel space. In some examples, the minimized residual value may correspond to a value that is less than a threshold amount smaller than the residual value calculated when applying a previous transformation. The threshold amount may include a value (e.g., 0.001), or a percentage (e.g., 0.1%) decrease from a residual value resulting from application of the previous transformation.

At 710, the calibration computing device determines a transformation that corresponds to the minimized residual value. The transformation may include a modification to one or more translational components and/or one or more rotational components.

At 712, the calibration computing device calibrates the at least one sensor based on the dimensional adjustments. In various examples, after the plurality of sensors of the vehicle are calibrated, the calibration computing device may be configured to determine a drift error (i.e., position error) of the vehicle and/or trajectory error associated with a trajectory of the vehicle.

Figure 8:
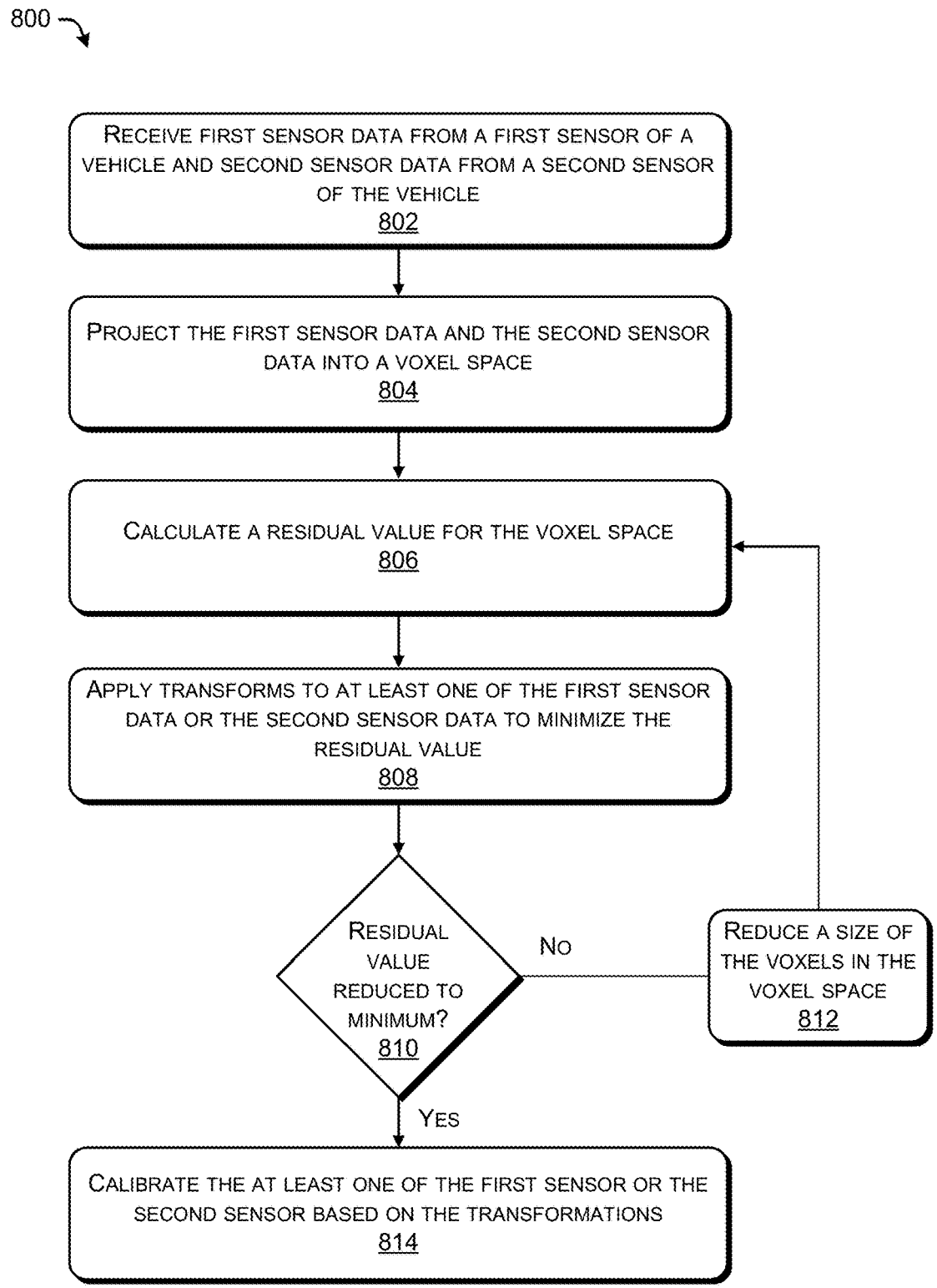
FIG. 8 is a flow diagram of another illustrative process for calibrating a sensor of a vehicle.

FIG. 8 is a flow diagram of an illustrative process 800 for calibrating one or more sensors of a vehicle, such as vehicle 102, as performed by a calibration computing device. As discussed above, the calibration computing device may be a vehicle computing device, such as vehicle computing device 106, or a server device associated with a calibration/localization server, such as calibration/localization server 108.

At 802, the calibration computing device receives first sensor data from a first sensor of the vehicle and second sensor data from a second sensor of the vehicle. In some examples, the first sensor and the second sensor may comprise LIDAR sensors. In some examples, the first sensor and the second sensor may be two sensors of a plurality of sensors of the vehicle. In at least one example, the vehicle may comprise eight sensors.

At 804, the calibration computing device projects the first sensor data and the second sensor data into a voxel space. The voxel space may represent a three-dimensional representation comprising a plurality of voxels.

At 806, the calibration computing device calculates a residual value for the voxel space. The residual value for the voxel space may include an aggregation of the residual values for each voxel in the voxel space. In some examples, the residual value may include an aggregation of the residual value for each occupied voxel in the voxel space and/or each voxel including a threshold number of data points associated therewith (e.g., 5). In such examples, the calibration computing device may be configured to identify the occupied voxels (i.e., voxels comprising data points corresponding to the first sensor data and/or the second sensor data) and/or the voxels including the threshold number of data points.

In various examples, a voxel score may include a residual value of the voxel. In some examples, the residual value may correspond to a smallest eigenvalue associated with the voxel.

In some examples, the residual may be computed as the distance between an average position to a plane. In such examples, the plane may be determined by calculating a best fit plane based on the statistical data by using a principal component analysis or Eigen value decomposition of the covariance. In such an example, the smallest eigenvector may correspond to a normal of a plane and a corresponding eigenvalue may correspond to an effective thickness of the plane. Additionally, or in the alternative, the plane may be derived from a previous calculation and/or based at least in part on a 3D mesh provided of the environment. In those examples, where the number of points is below the threshold, an occupancy penalty may be imposed on that voxel by assigning the residual of that voxel a maximum value and identifying that voxel as "invalid." In some examples, the maximum value may be one or more of a length, width, height, or diagonal of the voxel.

At 808, the calibration computing device may apply transforms to at least one of the first sensor data or the second sensor data to in order to minimize the residual value. The transformations may be performed using an anxious search. In some examples, the magnitude of a transformation may be determined based on a size of the voxels in the voxel space. In some examples, multiple transformations may be performed using successively smaller magnitudes.

In various examples, the calibration computing device may determine the initial directional and orientation dimensions associated with respective sensor data. The calibration computing device may adjust one or more directional dimensions and one or more orientation dimensions to minimize the voxel score. In some examples, the directional dimensions and the orientation dimensions may be adjusted independently of one another. In various examples, the calibration computing device may adjust two dimensions at a time. In some examples, calibration computing device may adjust three dimensions at once.

In various examples, the calibration computing device may calculate a residual for every combination of directional and/or orientation dimensions. The directional and/or orientation dimensions associated with the lowest residual value may be stored as the minimized residual value for the respective dimensions.

In various examples, the calibration computing device may additionally minimize an occupancy score associated with the voxels in the voxel space. In such examples, the calibration computing may apply a penalty to the occupied voxels to reduce the occupancy score associated therewith. In various examples, the minimized residual score may include the minimized occupancy score.

At 810, the calibration computing device determines whether the voxel size is reduced to the minimum size. In various examples, the minimum voxel size may include a pre-defined minimum height, width, and length of the voxel. In some examples, the height, width, and length of a voxel may be the same (i.e., the voxel comprises a cube). In other examples, the height, width, and length of the voxel may be different.

At 812, responsive to a determination that the voxel size is not reduced to the minimum size, the calibration computing device reduces a size of the voxels in the voxel space, and iteratively minimizes the residual value by performing operations 806-810 until the voxel size is reduced to a minimum.

At 814, responsive to a determination that the voxel size is reduced to the minimum size, the calibration computing device calibrates at least one of the first sensor or the second sensor. In various examples, the calibration computing device may determine a total adjustment made to the first sensor and/or the second sensor throughout the transformations. In such examples, the total adjustment may include a difference between sensor data dimensions (x, y, z, pitch, roll, yaw) associated with the minimized residual value calculated for a minimized voxel size and the initial sensor data dimensions. Thus, the total adjustment may include a difference between an initial X, Y, Z, pitch, roll, yaw setting of the sensor and/or sensor data and a final X, Y, Z, pitch, roll, yaw setting of the sensor and/or sensor data when the voxel size and residual values are minimized. The total adjustment may be stored as the calibration parameters for the sensor, and may be applied to subsequent data received from the sensor.

Figure 9:
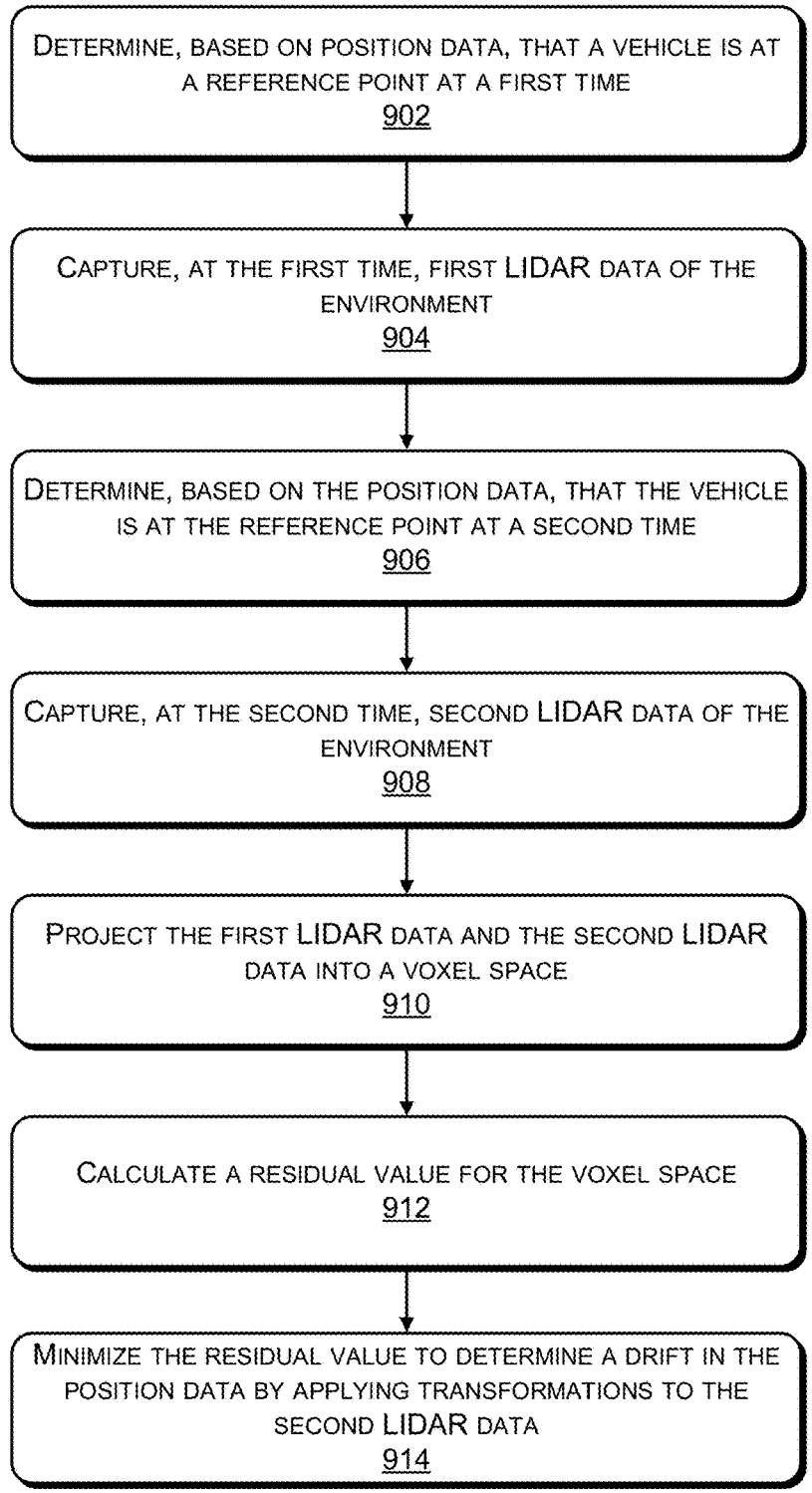
FIG. 9 is a flow diagram of an illustrative process for determining a position error using LIDAR sensor data.

FIG. 9 is a flow diagram of an illustrative process 900 for determining a drift error in position data using LIDAR sensor data, as performed by a calibration computing device. As discussed above, the calibration computing device may be a vehicle computing device, such as vehicle computing device 106, or a server device associated with a calibration/localization server, such as calibration/localization server 108.

At 902, the calibration computing device determines, based on, for example, position data and/or localization data, that a vehicle is at a reference point at a first time. The position and/or localization data may include motion sensor data, navigation sensor data, and/or perception data (e.g. from any one or more of LIDAR(s), camera(s), RADAR(s), ultrasonic(s)/SONAR(s), or the like). The first time may correspond to a first pass of the reference point on a path of the vehicle.

At 904, the calibration computing device may capture, at the first time, first LIDAR data of the environment at the reference point. The environment may include an area proximate to the reference point. The second LIDAR data may include first collective sensor data (e.g., metaspin) captured by the LIDAR sensors on the vehicle.

In some examples, the calibration computing device may cause the LIDAR sensors to capture the first LIDAR data at the reference point. In some examples, the calibration computing device may receive data from each of the LIDAR sensors, and may filter the data to identify data collected at the first time.

At 906, the calibration computing device determines, based on the position data, that the vehicle is at the reference point at a second time. The second time may correspond to a second pass of the reference point on a path of the vehicle.

At 908, the calibration computing device may capture, at the second time, second LIDAR data of the environment at the reference point. The second LIDAR data may include second collective sensor data captured by the LIDAR sensors on the vehicle.

At 910, the calibration computing device projects the first LIDAR data and the second LIDAR data into a voxel space. The voxel space may include a fixed, three-dimensional grid of the environment proximate to the reference point.

At 912, the calibration computing device calculates a residual value for the voxel space. The residual value for the voxel space may include a sum of the residual values for each voxel in the voxel space. In some examples, the voxel score for the voxel space may include a sum of each occupied voxel, and/or each voxel with a threshold number of data points associated therewith, in the voxel space. In some examples, the residual value for each voxel may include an occupancy score of the voxel.

At 914, the calibration computing device minimizes the residual value for the voxel space to determine a drift error in the position data by applying transformations to the second LIDAR data, while maintaining a pose associated with the first LIDAR data. The calibration computing device may apply transformations the second LIDAR data that adjust one or more dimensions (e.g., X, Y, Z, pitch, roll, yaw) of the second LIDAR data. In various examples, the calibration computing device may minimize the residual value by applying anxious search techniques. In such examples, the anxious search may comprise a number of magnitudes and a number of search directions.

In some examples, the calibration computing device may continue applying transformations to the second LIDAR data until an amount of reduction in the residual value of the voxel space does not reduce greater than a threshold amount from a previous minimum value. In some examples the magnitude of the transformations may be proportional to a size of the voxels in the voxel space.

In various examples, the calibration computing device may calculate a drift error or position error in the position data based on the transformations. In such examples, the drift error may correspond to a difference between initial dimensions of the second LIDAR data and the dimensions of the second LIDAR data corresponding to the minimized voxel score.

Figure 10:
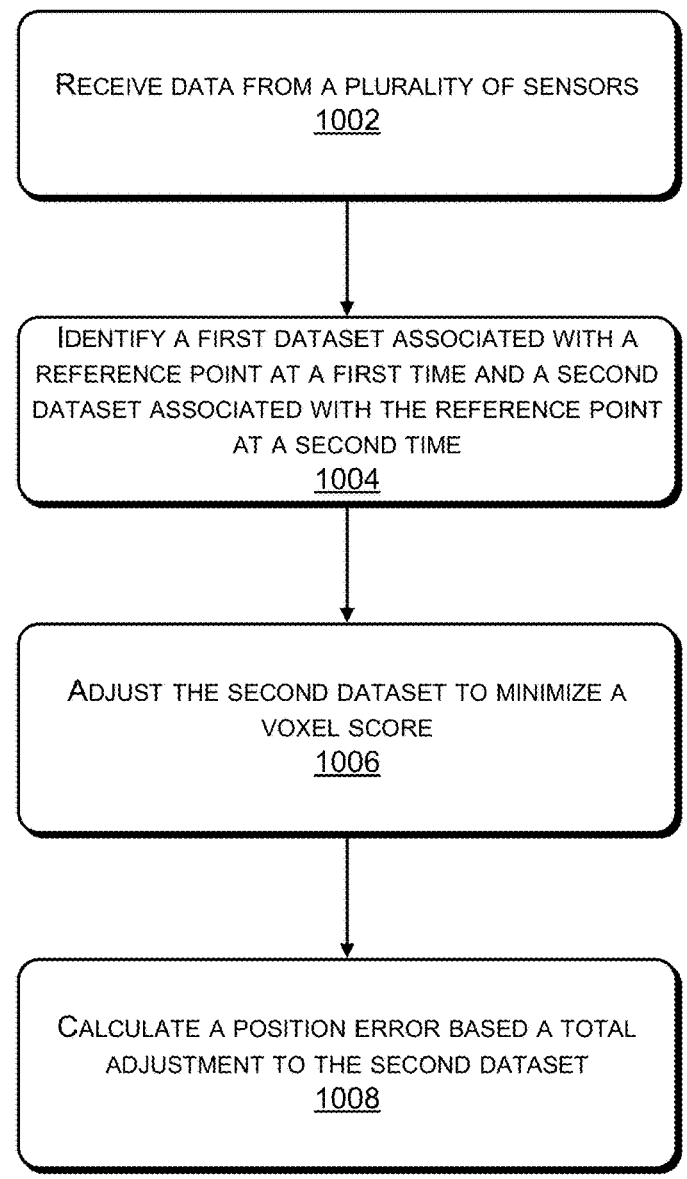
FIG. 10 is a flow diagram of an illustrative process for determining a position error of a vehicle.

FIG. 10 is a flow diagram of an illustrative process 1000 for determining a drift error in position data using LIDAR sensor data, as performed by a calibration computing device. As discussed above, the calibration computing device may be a vehicle computing device, such as vehicle computing device 106, or a server device associated with a calibration/localization server, such as calibration/localization server 108.

At 1002, the calibration computing device receives data from a plurality of sensors. In some examples, the data may comprise LIDAR data.

At 1004, the calibration computing device identifies a first dataset associated with a first reference point at a first time and a second dataset associated with the reference point at a second time. In various examples, the first time may correspond to a first pass of the reference point along a path of a vehicle, and the second time may correspond to a second pass of the reference point along the path. In various examples, the calibration computing device may determine the first time and the second time based on positioning data received from one or more sensors of the vehicle. In some examples, the one or more sensors may comprise motion sensors and/or position sensors.

At 1006, the calibration computing device adjusts the second dataset relative to the first dataset to minimize a voxel score. In various examples, the adjustments may include adjusting dimensions associated with the second dataset. In some examples, the calibration computing device may adjust two or three dimensions simultaneously. In some examples, calibration computing device may adjust the positions of the data points with respect to translational (e.g., directional with respect to X, Y, Z) dimensions and rotational (e.g., orientation with respect to pitch, roll, yaw) dimensions independently. With every adjustment or perturbation, the calibration computing device may calculate a residual value associated with each voxel. The calibration computing device may select positions for the data points with respect to each dimension that correspond to the smallest residual values associated with the voxels. The selected positions in X, Y, Z, pitch, roll, and yaw that correspond to the smallest residual values may be selected as the final dimensions.

At 1008, the calibration computing device may calculate a position error based on a total adjustment to the second dataset. The total adjustment may include a difference between the final dimensions and initial dimensions associated with the second dataset.

Figure 11:
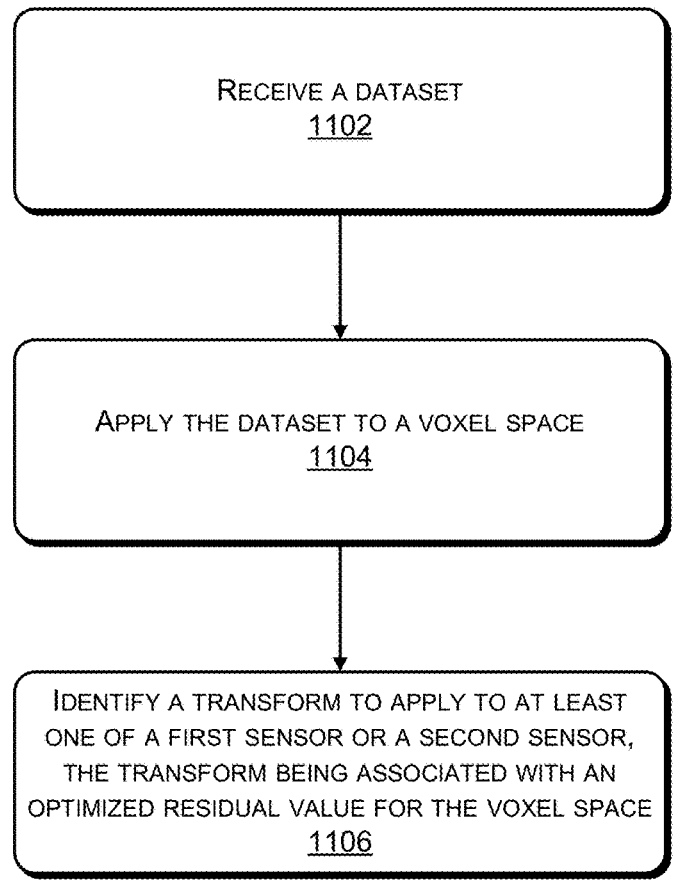
FIG. 11 is a flow diagram of an illustrative process for adjusting dimensions of a LIDAR dataset.

FIG. 11 is a flow diagram of an illustrative process 1100 for identifying a set of dimensions associated with a smallest residual value for a voxel in a voxel space, as performed by a calibration computing device. As discussed above, the calibration computing device may be a vehicle computing device, such as vehicle computing device 106, or a server device associated with a calibration/localization server, such as calibration/localization server 108.

At 1102, the calibration computing device receives a dataset. In some examples, the dataset may include collective sensor data (e.g., metaspin). In some examples, the dataset may include sensor data corresponding to two or more sensors, such as LIDAR sensors of a vehicle.

At 1104, the calibration computing device applies the dataset to a voxel space. In some examples, the dataset may be applied by projecting the data points of the dataset into the voxel space based on the coordinates associated with each of the data points.

At 1106, the calibration computing device identifies a transform to apply to at least one of a first sensor or a second sensor. The transform may be associated with an optimized residual value for the voxel space. In various examples, the transform may include a perturbation of at least one directional dimension or at least one orientation dimension of the respective sensor. In some examples, the calibration computing device may apply transforms of different combinations of directional (i.e., associated with the X-axis, Y-axis, Z-axis of the sensor) and/or orientation (i.e., associated with pitch, roll, yaw of the sensor) dimensions iteratively until an optimized residual value results from the transforms. In various examples, a magnitude of the transforms may be based at least in part on a voxel size of the individual voxels in the voxel space. In some examples, the magnitude may be a predefined number and/or set of numbers (e.g. {0.25 m, 0.5 m, 1 m, 2 m, 4 m, 8 m}). In other examples, the magnitudes may correspond to a number of scalar multiples of a single magnitude.

In various examples, the calibration computing device may calibrate the at least one of the first sensor or the second sensor based on the transform associated with the optimized residual value. In some examples, the calibration computing device may determine a drift error of the vehicle based at least in part on the transform.

Though referenced above with respect to calibrating one or more sensors and determining a measurement position error, it may be appreciated that the anxious search described in detail above may be used in various other applications. As non-limiting examples, consider the following. Two or more sets of accumulated sensor data may be compared using the same method as described in the measurement position error method above. When the two sets compared are generated at multiple times at the position a loop closure event (e.g. a recognition of being in a substantially similar position as in a previous state), such a comparison yields a trajectory drift, which can be used for trajectory compensation. When the two sets of data compared were generated along a trajectory over a short time span, such measurement position error may be used as a form of sensor (e.g. LIDAR) odometry. When comparing sensor data from two independent trajectories, such a measurement position error may be used to produce prior map products. When determining measurement position error between a prior map product and current collective sensor data, the measurement position error provides localization and/or geolocation of the sensors. By performing calibration, as described above, on a single sensor with respect to a remainder of one or more sensors, an output of the calibration may be a calibration of a vehicle's sensors to each other and with respect to a vehicle frame. Additionally, or in the alternative, by calibrating sensor data from a single sensor with additional data from the same sensor using an Eigenvalue decomposition calculation, such a sensor may be calibrated with respect to a vehicle frame.

Figure 12:
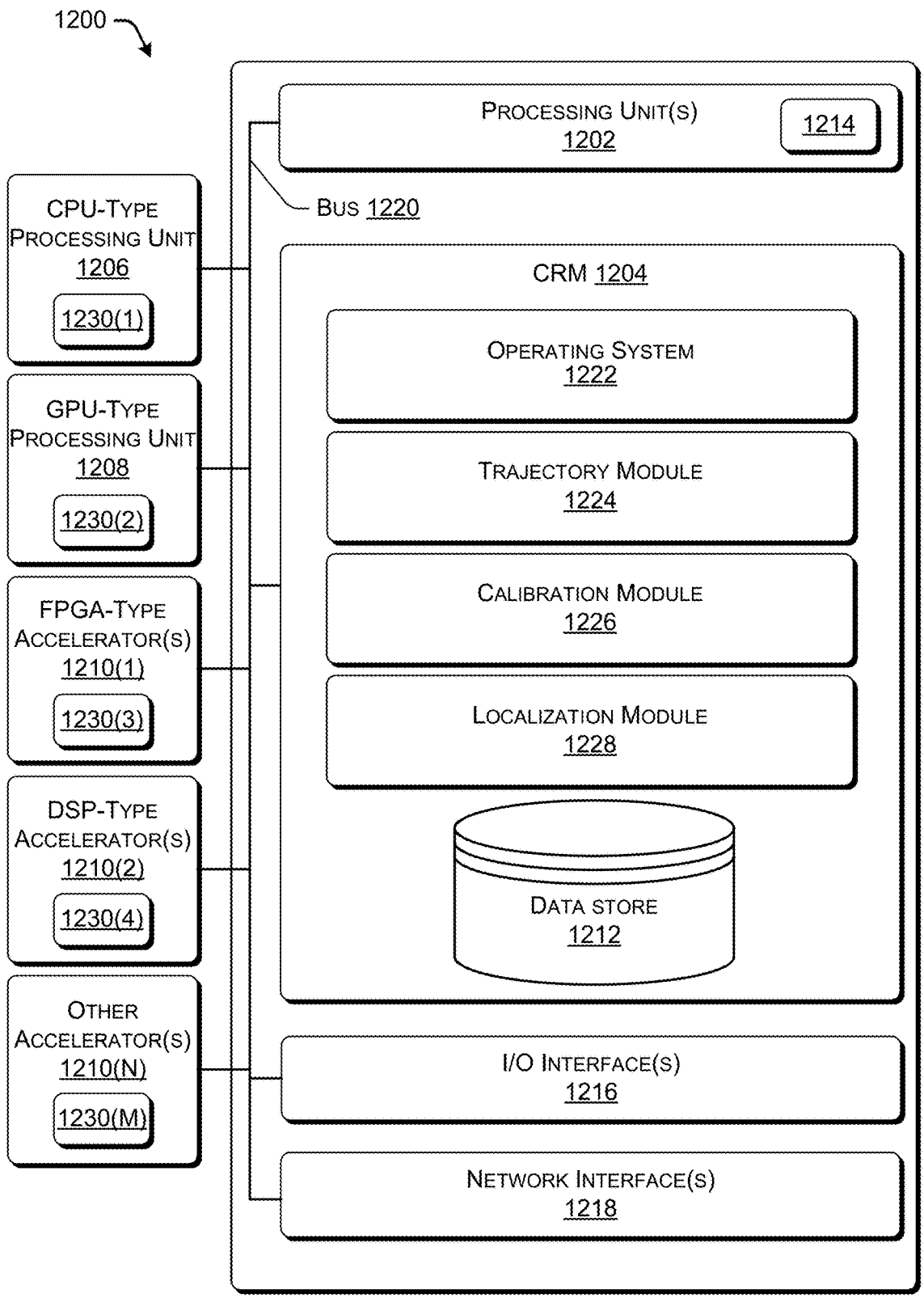
FIG. 12 is a block diagram of an example computer system for implementing the techniques described herein.

FIG. 12 illustrates an example calibration computing device 1200 configured to calibrate one or more sensors of a vehicle and/or determine a position error of the vehicle. The calibration computing device 1200 may represent a vehicle computing device, such as vehicle computing device 106 and/or a calibration/localization server, such as calibration/localization server 108. In calibration computing device 1200, processing unit(s) 1202 can represent, for example, a CPU-type processing unit, a GPU-type processing unit, a field-programmable gate array (FPGA), another class of digital signal processor (DSP), or other hardware logic components that may, in some instances, be driven by a CPU. For example, and without limitation, illustrative types of hardware logic components that can be used include Application-Specific Integrated Circuits (ASICs), Application-Specific Standard Products (ASSPs), System-on-a-chip systems (SOCs), Complex Programmable Logic Devices (CPLDs), etc.

In some examples, the calibration computing device 1200 can be one of a plurality of devices, such as server devices 112(1), 112(2), and 112(N), which are part of a distributed service platform (e.g. the Cloud). In some examples, the calibration computing device 1200 can be one of a plurality of devices which are capable of connection via a proximity network. In various examples, the calibration computing device 1200 can be one of a plurality of devices which are both part of a distributed service platform and capable of connection via a proximity network.

In some examples, a computer-readable medium (CRM) 1204 may store instructions executable by the processing unit(s) 1202, which as discussed above, can represent a processing unit incorporated in calibration computing device 1200. CRM 1204 can also store instructions executable by external processing units such as by an external CPU-type processing unit 1206, an external GPU-type processing unit 1208, and/or executable by an external accelerator 1210, such as an FPGA-type accelerator 1210(1), a DSP-type accelerator 1210(2), or any other accelerator 1210 (N). In various examples, at least one CPU-type processing unit 1206, GPU-type processing unit 1208, and/or accelerator 1210 is incorporated in the calibration computing device 1200, while in some examples one or more of a CPU-type processing unit 1206, GPU-type processing unit 1208, and/or accelerator 1210 is external to the calibration computing device 1200.

In the illustrated example, CRM 1204 also includes a data store 1212. In some examples, data store 1212 includes data storage such as a database, data warehouse, or other type of structured or unstructured data storage. In some examples, data store 1212 can include a corpus and/or a relational database with one or more tables, indices, stored procedures, and so forth to enable data access including one or more of hypertext markup language (HTML) tables, resource description framework (RDF) tables, web ontology language (OWL) tables, and/or extensible markup language (XML) tables, for example. Data store 1212 can store data for the operations of processes, applications, components, and/or modules stored in CRM 1204 and/or executed by processing unit(s) 1202. Alternately, some or all of the above-referenced data and/or instructions can be stored on separate memories 1214 on board one or more processing unit(s) 1202, CPU-type processing unit 1206, GPU-type processing unit 1208 and/or accelerator(s) 1210. For example, the data store 1212 may store sensor data, trajectory data, region of interest data (e.g., voxel scores associated with the region of interest, residual values associated with the region of interest, etc.), and/or other data used in sensor calibration and vehicle localization.

Calibration computing device 1200 can further include one or more input/output (I/O) interfaces 1216 to allow the calibration computing device 1200 to communicate with input/output devices such as user input devices including peripheral input devices (e.g., a keyboard, a mouse, a pen, a game controller, a voice input device, a touch input device, a gestural input device, and the like) and/or output devices including peripheral output devices (e.g., a display, a printer, audio speakers, a haptic output, and the like). In addition, in calibration computing device 1200, network interface(s) 1218 can represent, for example, network interface controllers (NICs) or other types of transceiver devices to send and receive communications over a network, such as network 110.

In the illustrated example, calibration computing device 1200 can operably connect the processing unit(s) 1202 to CRM 1204, I/O interface(s) 1216, and network interface(s) 1218 via a bus 1220. In some examples, bus 1220 can include one or more of a system bus, a data bus, an address bus, a PCI bus, a Mini-PCI bus, and any variety of local, peripheral, and/or independent buses.

In the illustrated example, CRM 1204 also includes an operating system 1222, which can be any type of operating system, such as MICROSOFT WINDOWS, WINDOWS QNX™, IBM z/OS™, LINUX, ANDROID, iOS™, OS X™, NETBSD™, or any other operating system capable of managing computer hardware and software resources on calibration computing device 1200.

CRM 1204 also includes a trajectory module 1224, such as trajectory module 126, a calibration module 1226, such as calibration module 120, and a localization module 1228, such as localization module 122. Functionality described associated with the trajectory module 1224, the calibration module 1226, and the localization module 1228 may be combined into one module or may be split and performed by a larger number of modules and/or APIs. In various examples, the trajectory module 1224 may be configured to receive data from one or more motion sensors (e.g., inertial measurement units (IMU) sensors, accelerometers, gyroscopes, rotary (wheel) encoders, etc.), one or more navigation sensors (e.g., global positioning system (GPS) sensor, INS sensor, etc.), and/or one or more other sensors (e.g., LIDAR(s), camera(s), RADAR(s), SONAR(s), etc.) of the vehicle. The trajectory module 1224 may determine trajectory data of the vehicle using the data from any one or more of the above-mentioned sensors. The trajectory data may include a speed, direction, position, pitch, roll, yaw, and/or rates thereof, and/or other data associated with the movement of the vehicle.

In various examples, the trajectory module 1224 may identify a central location of a region of interest based at least in part on the trajectory data. In some examples, the central location may be determined based on a yaw rate of the vehicle at a given time. In some examples, the central location may be determined based on a radius of curvature of a path on which the vehicle travels, such as a road.

In various examples, the trajectory module 1224 may determine the region of interest by generating a time window centered on the central location. In such examples, the time window may include a number of seconds before the central location and a number of seconds after the central location. In various examples, the number of seconds may be a fixed number of seconds. In some examples, the number of seconds may be based on the trajectory data, such as the speed of the vehicle.

In various examples, the calibration module 1226 may be configured to calibrate one or more sensors of the vehicle. The calibration module 1226 may receive region of interest data from the trajectory module 1224. The region of interest data may include a central location and/or a time window associated with the region of interest. The calibration module 1226 may be configured to filter or extract LIDAR data captured by the sensor(s) when the vehicle was in the region of interest to determine a LIDAR dataset for calibration. The calibration module 1226 may project the LIDAR dataset into a three-dimensional (3D) voxel space, and may identify the voxels having data points located therein.

In various examples, the calibration module 1226 may calculate an occupancy score (e.g., cost function) for each occupied voxel in the voxel space. In various examples, the occupancy score may be determined by multiplying a number of data points in a voxel by a penalty number. The penalty number may represent a minimum cost for having a data point in a voxel. In various examples, the calibration module 1226 may be configured to minimize the cost function of voxel occupancy, thereby minimizing the number of voxels used in the calibration. In various examples, the calibration module 1226 may identify voxels with an occupancy score above a threshold, and may select the identified voxels for further processing.

The calibration module 1226 may calculate a residual value for each voxel in the voxel space. In various examples, the calibration module 1226 may calculate the residual value by performing a principal component analysis. In such examples, the residual value may include the smallest eigenvalue. In some examples, the calibration module 1226 may determine a plane of the voxels based on data from (x−1) sensors 114, where x is a total number of sensors on the vehicle. In such examples, the calibration module 1226 may calculate the residual value for the voxel based on a distance from the single sensor to the plane determined by the other sensors.

In various examples, the calibration module 1226 may determine an initial voxel score for each voxel by summing the occupancy score and the residual value for each voxel. In some examples, the calibration module 1226 may calculate an initial total voxel score for the voxel space.

The calibration module 1226 may determine a calibration for the sensor(s) by adjusting (e.g., perturbing) one or more dimensions (X, Y, Z, pitch, roll, yaw) of the sensor data captured by one or more sensors using an anxious search technique. The calibration module 1226 may continually adjust a transformation of the sensor data until the residual value for each voxel, and consequently the voxel score for each voxel, is minimized. In various examples, calibration module 1226 may determine the residual value is minimized based on a determination that one or more perturbations increases the residual value. In some examples, the calibration module 1226 may determine the residual value is minimized based on a determination that one or more perturbations do not substantially reduce the residual value. In some examples, a substantial reduction may include a reduction greater than a threshold reduction value.

In various examples, responsive to a determination that the residual value is minimized for a given voxel size, the calibration module 1226 may reduce the voxel size and repeat the anxious search techniques described above. In some examples, the calibration module 1226 may reduce the voxel size by ½ for each iteration of voxel size reduction. In various examples, the calibration module 1226 may perform one or more iterations of voxel size reduction. In at least one example, the calibration module 1226 may perform 6 iterations of voxel size reduction. For example, an initial voxel may comprise a 12-meter cube. The calibration module 1226 may perturb data to minimize the residual value with each iteration of voxel size from a 12 m cube to a 0.375 m cube (e.g., optimizing for each voxel size of 12 m 6 m, 3 m, 1.5 m, 0.75 m, 0.375 m). In some examples, the calibration module 126 may iteratively reduce the magnitude of perturbations and the dimension of voxels in the voxel space.

After completing the voxel size reduction iterations, and optimizing the residual values and voxel scores, the calibration module 1226 may calibrate the sensor(s). The calibration may be performed by determining a total adjustment to make to the data corresponding to each sensor being calibrated and/or a total adjustment to make to the collective sensor data. The calibration module 1226 may apply the total adjustments to subsequently received sensor data.

In various examples, the calibration module 1226 may be configured to verify the calibration of one or more sensors. In some examples, the verification may be performed periodically, such as every hour, every day, once per week, etc. In some examples, the verification may be performed based on an indication that sensor(s) may be out of calibration.

In some examples, the calibration module 1226 may take an affected sensor offline during verification and/or re-calibration. In such examples, should the affected LIDAR sensor be out of calibration, the data captured therefrom may not negatively impact the operation of the vehicle. In some examples, the calibration module 1226 may leave the affected sensor online during verification and/or re-calibration.

To verify the calibration of a sensor, the calibration module 1226 may identify data associated with a region of interest. In some examples, the calibration module 1226 may use the data associated with the region of interest to calculate a residual value corresponding to each occupied voxel in the voxel space. In some examples, the calibration module 1226 may compare the current residual value to the initial calibration residual value for each voxel in the voxel space. In some examples, the calibration module 1226 may calculate a current voxel space residual value by adding residual scores for the occupied voxels in the voxel space. In such examples, the calibration module 1226 may compare the current voxel space residual value to a voxel space residual value corresponding to the initial calibration. In some examples, the calibration module 1226 may compare current voxel scores for each value and/or a voxel space voxel score to the respective voxel scores corresponding to the initial calibration.

In various examples, the calibration module 1226 may access the data store 1212 comprising residual values and/or voxel scores associated with a region of interest. In such examples, the calibration module 1226 may compare the current residual values and/or voxel scores for data collected in a particular region of interest to the stored residual values and/or voxel scores corresponding to the particular region of interest.

In some examples, the calibration module 1226 may determine that a sensor is out of calibration based on the current residual value and/or voxel score being a threshold value greater than the residual value and/or voxel score corresponding to the initial calibration. Responsive to a determination that a sensor is out of calibration, the calibration module 1226 may re-calibrate the sensor using the techniques described above.

In various examples, the calibration computing device 1200 may include a localization module 1228 configured to determine a position error (e.g., drift error) associated with the vehicle. As discussed above, the vehicle may include one or more motion sensors and/or one or more navigation sensors and/or one or more other sensors. The calibration computing device 1200, such as via the trajectory module 1224, may receive input from the sensor(s), and may determine a position and/or orientation (e.g., positioning data) of the vehicle. Over time in operation, errors may accumulate, resulting in errors in the positioning data. To correct the position errors, or drift errors of a vehicle, the localization module 1228 process data captured at a reference point. In some examples, the reference point may include a pre-defined reference point on a route of the vehicle. In some examples, the reference point may include any point along a route of the vehicle that will be passed twice while the vehicle travels the route.

In some examples, the localization module 1228 may cause the sensor(s) to capture the collective sensor data responsive to an indication that the vehicle is located at the reference point. In some examples, the localization module 1228 may filter collective sensor data to process data captured at the reference point for at least two passes of the reference point. For example, the localization module 1228 may receive an indication that the vehicle is at the reference point on a first pass thereof. The localization module 1228 may receive first collective sensor data corresponding to the first pass of the reference point, and may project the first collective sensor data into a voxel space. The localization module 1228 may then receive an indication that the vehicle is at the reference point on a second pass thereof. The localization module 1228 may receive second collective sensor data corresponding to the second pass of the reference point, and may project the second collective sensor data into the voxel space.

In various examples, the localization module 1228 may calculate an initial voxel score for the voxel space. The initial voxel score may comprise a sum of occupancy scores and residual values for each voxel in the voxel space. In various examples, the localization module 1228 may minimize the voxel scores corresponding to each voxel. The minimization may include minimizing a cost function of voxel occupancy. The minimization may additionally include minimizing residual values of each voxel in the voxel space. In various examples, the localization module 1228 may minimize the residual values by using anxious search techniques on a subsequently captured dataset (e.g., second collective data). In such examples, the localization module 1228 may adjust one or more transformation(s) of the second collective data while keeping the first collective data constant. The localization module 1228 may determine a total adjustment to the second collective data that results in a crisp image of data in the voxel space. Based on the total adjustment, the localization module 1228 may estimate the error in the position and/or orientation (e.g., delta transform) from the first pass in which the first collective sensor data was captured, to the second pass in which the second collective sensor data was captured. The localization module 1228 may apply the delta transform to the positioning data (e.g., data from the motion sensors and/or navigation sensors), to accurately localize the vehicle.

Additionally, some or all of the above-referenced data can be stored on separate memories 1230, such as memory 1230(1) on board a CPU-type processing unit 1206, memory 1230(2) on board a GPU-type processing unit 1208, memory 1230(3) on board an FPGA-type accelerator 1210(1), memory 1230(4) on board a DSP-type accelerator 1210(2), and or memory 1230(M) on board another accelerator 1210(N).

It should be appreciated that the subject matter presented herein may be implemented as a computer process, a computer-controlled apparatus, a computing system, or an article of manufacture, such as a computer-readable storage medium. While the subject matter described herein is presented in the general context of program modules that execute on one or more computing devices, those skilled in the art will recognize that other examples may be performed in combination with other types of program modules. Generally, program modules include routines, programs, components, data structures, and other types of structures that perform particular tasks or implement particular abstract data types.

Those skilled in the art will also appreciate that aspects of the subject matter described herein may be practiced on or in conjunction with other computer system configurations beyond those described herein, including multiprocessor systems, microprocessor-based or programmable consumer electronics, minicomputers, mainframe computers, handheld computers, mobile telephone devices, tablet computing devices, special-purposed hardware devices, network appliances, and the like.

Based on the foregoing, it should be appreciated that calibrating vehicle sensors and using sensor data collected therefrom to correct position errors have been presented herein. Moreover, although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and media are disclosed as example forms of implementing the subject matter recited in the claims.

The subject matter described above is provided by way of illustration only and should not be construed as limiting. Furthermore, the claimed subject matter is not limited to examples that solve any or all disadvantages noted in any part of this disclosure. Various modifications and changes may be made to the subject matter described herein without following the examples and applications illustrated and described, and without departing from the spirit and scope of the present invention, which is set forth in the following claims.

Example Clauses

A: A system comprising: one or more processors; and one or more computer readable storage media communicatively coupled to the one or more processors and storing instructions that are executable by the one or more processors to: receive first sensor data as a first dataset from a first sensor on a vehicle and second sensor data as a second dataset from a second sensor on the vehicle; project the first dataset and the second dataset into a voxel space; identify occupied voxels in the voxel space; calculate a residual value associated with individual voxels of the occupied voxels in the voxel space; adjust a position of the first dataset or the second dataset in the voxel space to optimize a magnitude of the residual value; and determine a sensor transformation corresponding to an optimized voxel score of the voxel space.

B: The system as paragraph A describes, wherein the instructions are further executable by the one or more processors to: determine an occupancy penalty for each voxel, wherein an occupancy score is determined based at least in part on the occupancy penalty; and minimize the occupancy score for each voxel in the voxel space by reprojecting datapoints corresponding to at least a subset of the second dataset based at least in part on the sensor transformation.

C: The system as either paragraphs A or B describe, wherein the first sensor and the second sensor are a same sensor.

D: The system as any of paragraphs A-C describe, wherein the instructions are further executable by the one or more processors to: determine the residual value based on one or more of a smallest eigenvalue resulting from an eigenvalue decomposition or the distance of datapoints in the first dataset from a plane representing at least the second dataset when determining the sensor transformation.

E: The system as any of paragraphs A-D describe, wherein the instructions are further executable by the one or more processors to: receive input from at least one of a motion sensor, a navigation sensor, an image sensor, or a depth sensor; determine a trajectory of the vehicle based at least in part on the input; and determine a region of interest based at least in part on the trajectory of the vehicle, wherein the first dataset or the second dataset is collected in the region of interest.

F: The system as paragraph E describes, wherein the region of interest comprises a central location and a time window centered on the central location, wherein the central location is identified based on at least one of: a yaw rate of the vehicle; a radius of curvature of the path; a position of the vehicle; or a speed of the vehicle.

G: The system as any of paragraphs A-F describe, wherein the instructions are further executable by the one or more processors to: calibrate at least one of the first sensor or the second sensor; calculate drift error associated with a position of the vehicle; or identify an error associated with a trajectory of the vehicle.

H: The system as any of paragraphs A-G describe, wherein the instructions are further executable by the one or more processors to: reduce a size of the voxels in the voxel space; and increase a number of voxels which populate the voxel space.

I: The system as any of paragraphs A-H wherein the instructions are further executable by the one or more processors to: calculate a second voxel score associated with the voxel space; and determine a second sensor transformation corresponding to a second optimized voxel score, wherein a calibration of the first sensor and the second sensor is based at least in part on the second sensor transformation.

J: A computer-readable medium having thereon computer-executable instructions that, responsive to execution, configure a computer to perform a system as any of paragraphs A-I describe.

K: A method comprising: receiving a dataset from a plurality of sensors of a vehicle; projecting the dataset into a voxel space; perturbing first sensor data of the dataset to reduce a residual value associated with the voxel space, the first sensor data corresponding to a first sensor of the plurality of sensors; determining a sensor transformation to the first sensor data that corresponds to a minimized residual value associated with the voxel space; and calibrating the first sensor of the plurality of sensors based at least in part on the sensor transformation.

L: The method as paragraph K describes, wherein the residual for each voxel comprises a sum of an occupancy score and a residual value, the residual value associated with one of an eigenvalue or a distance to a plane.

M: The method as either of paragraphs K or L describe, receiving an indication that the vehicle is located at a reference point at a first time; capturing a first collective dataset at the first time, the first collective dataset comprising a first metaspin associated with the plurality of sensors and corresponding to an environment at the reference point; receiving an indication that the vehicle is located at the reference point at a second time; capturing a second collective dataset at the second time, the second collective dataset comprising a second metaspin associated with the plurality of sensors and corresponding to the environment at the reference point; projecting the first collective dataset and the second collective dataset into the voxel space corresponding to the environment at the reference point; perturbing one or more dimensions of the second collective dataset to minimize a residual value associated with the second voxel space; and determining a positioning error between the first time and the second time.

N: The method as any of paragraphs K-M describe, further comprising: calculating a trajectory of the vehicle based on at least one of motion sensor data or navigation sensor data; determining that the trajectory corresponds to a region of interest; and identifying a time window associated with the region of interest, wherein the first sensor data comprises data collected in the region of interest.

O: The method as paragraph N describes, wherein a determination that the trajectory corresponds to the region of interest is based on at least one of: a yaw rate of the vehicle; a radius of curvature of the path; a position of the vehicle; or a speed of the vehicle.

P: The method as any of paragraphs K-O describe, further comprising: determining that a size of voxels in the voxel space is not a minimum size; reducing the size of voxels in the voxel space; increasing a number of voxels in the voxel space; and iteratively determining the transformation to the first sensor data for each reduced size of the voxels, wherein a calibration of the first sensor is based on an iterative determination of the transformation.

Q: The method as any of paragraphs K-P describe, further comprising: receiving an indication that the first sensor of the plurality of sensors is out of alignment; removing data associated with the first sensor from an input to an operational control system of the vehicle, wherein calibrating the at least one sensor of the plurality of sensors comprises calibrating the first sensor; and responsive to a calibration of the first sensor, sending the first sensor data to the operational control system.

R: A system or device comprising: a processor; and a computer-readable medium coupled to the processor, the computer-readable medium including instructions to configure the processor to perform a computer-implemented method as any of paragraphs K-Q describe.

S: A system or device comprising: a means for processing; and a means for storing coupled to the means for processing, the means for storing including instructions to configure one or more devices to perform a computer-implemented method as any of paragraphs K-Q describe.

T: A computer-readable medium having thereon computer-executable instructions that, responsive to execution, configure a computer to perform a method as any one of paragraphs K-Q describe.

U: A device comprising: one or more processors; and one or more computer-readable storage media communicatively coupled to the one or more processors and storing instructions that are executable by the one or more processors to: receive a dataset from a plurality of sensors; project the dataset into a voxel space, the voxel space comprising a plurality of voxels; perturb first sensor data of the dataset to reduce a residual value associated with the voxel space, the first sensor data corresponding to a first sensor of the plurality of sensors and the residual value being based at least in part on a distance from each voxel associated with the first sensor data to a plane representing a portion of the dataset or a smallest eigenvalue of each voxel; and determine transformations to the first sensor data that correspond to a minimized residual value associated with the voxel space.

V: The device as paragraph U describes, wherein the instructions are further executable by the one or more processors to: receive data from at least one of a motion sensor, a navigation sensor, a depth sensor, or an image sensor; calculate a trajectory of the vehicle based on the data; determine that the trajectory corresponds to a region of interest; and identify a time window associated with the region of interest, wherein the dataset comprises data collected in the region of interest.

W: The device as either of paragraphs U or V describe, wherein the perturbing the first sensor data comprises adjusting a position with respect to one or more directional dimensions and one or more orientation dimensions associated with the first sensor data.

X: The device as any of paragraphs U-W describe, wherein the instructions are further executable by the one or more processors to: determine a size of voxels in the voxel space is not a minimum size; increase a number of voxels in the voxel space; reduce the size of voxels in the voxel space; and iteratively determine the transformations to the first sensor data for each reduced size of the voxels, wherein a calibration of the at least one sensor of the plurality of sensors is based on an iterative determination of the transformations.

Y: A system comprising: one or more processors; and one or more computer readable storage media communicatively coupled to the one or more processors and storing instructions that are executable by the one or more processors to: receive sensor data captured by a plurality of sensors of a vehicle; apply the sensor data to a voxel space; determine a first pose of a first sensor of the plurality of sensors and a second pose of a second sensor of the plurality of sensors; identify a transform to apply to the first sensor or the second sensor based at least in part on a set of perturbations, each perturbation in the set of perturbations comprising a magnitude and at least one of a directional dimension or at least one of an orientation dimension corresponding to at least one of a first sensor or a second sensor; calculate a residual value of the voxel space associated with each perturbation applied to the first sensor or the second sensor; and determine an optimized pose of the first sensor or the second sensor based at least in part on an optimized residual value of the voxel space, the optimized residual value corresponding to the transform associated with one of the set of perturbations.

Z: The system as paragraph Y describes, wherein the at least one of the orientation dimension corresponds to a pitch, roll, and yaw associated with the first sensor or the second sensor.

AA: The system as either paragraph Y or Z describe, wherein the at least one of the directional dimension corresponds to a translation of the first sensor or the second sensor with respect to an X-axis, a Y-axis, or a Z-axis.

AB: The system as any of paragraphs Y-AA describe, wherein the magnitude of each perturbation is based at least in part on a voxel size of individual voxels in the voxel space.

AC: The system as any of paragraphs Y-AB describe, wherein the set of perturbations comprises combinations of orientations and no change to the directional dimensions.

AD: The system as paragraphs AC describes, further comprising: determining at least one magnitude to apply to the set of perturbations; and applying the at least one magnitude to the set of perturbations, wherein the optimized residual value is based at least in part on an optimal value resulting from an application of the at least one magnitude to the set of perturbations.

AE: The system as any of paragraphs Y-AD describe, wherein the instructions are further executable by the one or more processors to calibrate at least one of the first sensor or the second sensor based at least in part on the optimized pose.

AF: The system as any of paragraphs Y-AE describe, wherein the instructions are further executable by the one or more processors to determine a drift error associated with a position of the vehicle based at least in part on the optimized pose.

AG: A computer-readable medium having thereon computer-executable instructions that, responsive to execution, configure a computer to perform a system as any of paragraphs A-I describe.

AH: A method comprising: receiving a dataset comprising first sensor data captured by a first sensor and second sensor data captured by a second sensor of a vehicle; applying the dataset to a voxel space; determining a residual value of the voxel space; and identifying a transform to apply to at least one of the first sensor or the second sensor with respect to at least one directional dimension or at least one orientation dimension of the respective sensor, the transform being associated with an optimized residual value for the voxel space.

AI: The method as paragraph AH describes, wherein the identifying the transform comprises perturbing the at least one directional dimension independently of the at least one orientation dimension.

AJ: The method as either of paragraphs AH or AI describe, wherein identifying the transform comprises perturbing the first sensor or the second sensor by a set of perturbations.

AK: The method as any of paragraphs AH-AJ describe, wherein the dataset is a first dataset, the method further comprising: receiving a first indication that the vehicle is at a reference point at a first time; based at least in part on the first indication, capturing the first dataset comprising a first representation of an environment proximate to the reference point; receiving a second indication that the vehicle is at the reference point at a second time; and based at least in part on the second indication, capturing a second dataset comprising a second representation of the environment proximate to the reference point; wherein the identifying the transform comprises perturbing dimensions associated with the second dataset.

AL: The method as any of paragraphs AH-AK describe, further comprising: calibrating at least one of the first sensor or the second sensor based at least in part on the transform; or determining a drift error of the vehicle based at least in part on the transform.

AM: The method as any of paragraphs AH-AL describe, wherein identifying the transform comprises perturbing the first sensor or the second sensor by a set of perturbations, and the method further comprising determining a size of the voxels in the voxel space, wherein each perturbation in the set of perturbations is based at least in part on the size of the voxels.

AN: The method as any of paragraphs AH-AM describe, wherein identifying the transform comprises perturbing the first sensor or the second sensor by a set of perturbations, and wherein each perturbation of the set of perturbations comprises a magnitude with respect to the at least one directional dimension or the at least one orientation dimension.

AO: A system or device comprising: a processor; and a computer-readable medium coupled to the processor, the computer-readable medium including instructions to configure the processor to perform a computer-implemented method as any of paragraphs AH-AN describe.

AP: A system or device comprising: a means for processing; and a means for storing coupled to the means for processing, the means for storing including instructions to configure one or more devices to perform a computer-implemented method as any of paragraphs AH-AN describe.

AQ: A computer-readable medium having thereon computer-executable instructions that, responsive to execution, configure a computer to perform a method as any one of paragraphs AH-AN describe.

AR: One or more non-transitory computer-readable storage media communicatively coupled to one or more processors and storing instructions that are executable by the one or more processors to: receive a dataset comprising first sensor data captured by a first sensor and second sensor data captured by a second sensor; project the dataset into a voxel space; identify a transform to apply to at least one of the first sensor or the second sensor with respect to at least one directional dimension or at least one orientation dimension of the respective sensor, the transform being associated with an optimized residual value for the voxel space.

AS: The one or more non-transitory computer-readable storage media as paragraph AR describes, wherein the instructions are further executable by the one or more processors to: calibrate at least one of the first sensor or the second sensor based at least in part on the transform; or determine a drift error of the vehicle based at least in part on the transform.

AT: The one or more non-transitory computer-readable storage media as either of paragraphs AR or AS describe, wherein: the orientation dimensions correspond to at least one of a pitch, a roll, or a yaw; and the directional dimensions correspond to at least one of an X-axis, a Y-axis, or a Z-axis.

AU: The one or more non-transitory computer-readable storage media as any of paragraphs AR-AT describe, wherein an application of the transform to the at least one of the first sensor or the second sensor with respect to the at least one directional dimension or the orientation dimension comprises modifications to two or three dimensions simultaneously.

AV: The one or more non-transitory computer-readable storage media as any of paragraphs AR-AU describe, wherein a magnitude of the transform is based at least in part on a voxel size of individual voxels in the voxel space.

A system or device comprising: a processor; and a computer-readable medium coupled to the processor, the computer-readable medium including instructions to configure the processor to perform a computer-implemented method as any of paragraphs AR-AV describe.

What is claimed is:

1. A system comprising:
one or more processors; and
one or more computer readable storage media communicatively coupled to the one or more processors and storing instructions that are executable by the one or more processors to:
receive an indication that a first sensor or a second sensor of a plurality of sensors of a vehicle is out of alignment;
withhold first sensor data associated with the first sensor or second sensor data associated with the second sensor from an input to an operational control system of the vehicle;
receive the first sensor data as a first dataset from the first sensor on the vehicle and the second sensor data as a second dataset from the second sensor on the vehicle;
project the first dataset and the second dataset into a voxel space, wherein the voxel space comprises a three-dimensional representation comprising a plurality of voxels;
identify occupied voxels of the plurality of voxels in the voxel space;
calculate a residual value associated with individual voxels of the occupied voxels in the voxel space, wherein the residual value is based at least in part on information associated with the three-dimensional representation of the individual voxels of the occupied voxels;
adjust a position of the first dataset or the second dataset in the voxel space to optimize a magnitude of the residual value;
determine a sensor transformation corresponding to an optimized voxel score of the voxel space;
calibrate at least one of the first sensor or the second sensor based at least in part on the sensor transformation; and
responsive to a calibration of the at least one of the first sensor or the second sensor, send the first sensor data or the second sensor data to the operational control system.

2. The system of claim 1, wherein the instructions are further executable by the one or more processors to:
determine an occupancy penalty for each voxel, wherein an occupancy score is determined based at least in part on the occupancy penalty; and
minimize the occupancy score for each voxel in the voxel space by reprojecting datapoints corresponding to at least a subset of the second dataset based at least in part on the sensor transformation.

3. The system of claim 1, wherein the first sensor and the second sensor are a same sensor.

4. The system of claim 1, wherein the instructions are further executable by the one or more processors to:
determine the residual value based on one or more of a smallest eigenvalue resulting from an eigenvalue decomposition or a distance of datapoints in the first dataset from a plane representing at least the second dataset when determining the sensor transformation.

5. The system of claim 1, wherein the instructions are further executable by the one or more processors to:
receive input from at least one of a motion sensor, a navigation sensor, an image sensor, or a depth sensor;
determine a trajectory of the vehicle based at least in part on the input; and
determine a region of interest based at least in part on the trajectory of the vehicle,
wherein the first dataset or the second dataset is collected in the region of interest.

6. The system of claim 5, wherein the region of interest comprises a central location and a time window centered on the central location, wherein the central location is identified based on at least one of:
a yaw rate of the vehicle;
a radius of curvature of a path of the vehicle;
a position of the vehicle; or
a speed of the vehicle.

7. The system of claim 1, wherein the instructions are further executable by the one or more processors to:
calculate drift error associated with a position of the vehicle; or
identify an error associated with a trajectory of the vehicle.

8. The system of claim 1, wherein the instructions are further executable by the one or more processors to:
reduce a size of the voxels in the voxel space; and
increase a number of voxels which populate the voxel space.

9. The system of claim 1, wherein the instructions are further executable by the one or more processors to:
calculate a second voxel score associated with the voxel space; and
determine a second sensor transformation corresponding to a second optimized voxel score,
wherein the calibration of the first sensor and the second sensor is based at least in part on the second sensor transformation.

10. A method comprising:
receiving an indication that a first sensor of a plurality of sensors of a vehicle is out of alignment;

withholding first sensor data associated with the first sensor from an input to an operational control system of the vehicle;

receiving a dataset from the plurality of sensors of the vehicle;

projecting the dataset into a voxel space;

perturbing the first sensor data of the dataset to reduce a residual value associated with the voxel space, wherein the residual value is based at least in part on information associated with the voxel space;

determining a sensor transformation to the first sensor data that corresponds to a minimized residual value associated with the voxel space;

calibrating the first sensor of the plurality of sensors based at least in part on the sensor transformation; and responsive to a calibration of the first sensor, sending the first sensor data to the operational control system.

11. The method of claim 10, wherein respective residual values for respective voxels of the voxel space comprise a sum of respective occupancy scores and respective residual values, the respective residual values being associated with one of an eigenvalue or a distance to a plane.

12. The method of claim 10, further comprising:
receiving an indication that the vehicle is located at a reference point at a first time;
capturing a first collective dataset at the first time, the first collective dataset comprising a first metaspin associated with at least a portion of the plurality of sensors and corresponding to an environment at the reference point;
receiving an indication that the vehicle is located at the reference point at a second time;
capturing a second collective dataset at the second time, the second collective dataset comprising a second metaspin associated with the at least a portion of the plurality of sensors and corresponding to the environment at the reference point;
projecting the first collective dataset and the second collective dataset into the voxel space corresponding to the environment at the reference point;
perturbing one or more dimensions of the second collective dataset to minimize a residual value associated with the voxel space; and
determining a positioning error between the first time and the second time.

13. The method of claim 10, further comprising:
calculating a trajectory of the vehicle based on at least one of motion sensor data or navigation sensor data;
determining that the trajectory corresponds to a region of interest; and
identifying a time window associated with the region of interest,
wherein the first sensor data comprises data collected in the region of interest.

14. The method of claim 13, wherein a determination that the trajectory corresponds to the region of interest is based on at least one of:
a yaw rate of the vehicle;
a radius of curvature of a path of the vehicle;
a position of the vehicle; or
a speed of the vehicle.

15. The method of claim 10, further comprising:
determining that a size of voxels in the voxel space is not a minimum size;
reducing the size of voxels in the voxel space;

increasing a number of voxels in the voxel space; and
iteratively determining the sensor transformation to the first sensor data for each reduced size of the voxels,
wherein the calibration of the first sensor is based on an iterative determination of the sensor transformation.

16. A device comprising:
one or more processors; and
one or more computer readable storage media communicatively coupled to the one or more processors and storing instructions that are executable by the one or more processors to:
receive an indication that a first sensor of a plurality of sensors is out of alignment;
withhold first sensor data associated with the first sensor from an input to an operational control system of a vehicle;
receive a dataset from the plurality of sensors;
project the dataset into a voxel space, the voxel space comprising a plurality of voxels;
perturb the first sensor data of the dataset to reduce a residual value associated with the voxel space, the first sensor data corresponding to a first sensor of the plurality of sensors and the residual value being based at least in part on a distance from each voxel associated with the first sensor data to a plane representing a portion of the dataset or a smallest eigenvalue of each voxel;
determine transformations to the first sensor data that correspond to a minimized residual value associated with the voxel space;
calibrate the first sensor based at least in part on the transformations; and
based at least in part on a calibration of the first sensor, send the first sensor data to the operational control system.

17. The device of claim 16, wherein the instructions are further executable by the one or more processors to:
receive data from at least one of a motion sensor, a navigation sensor, a depth sensor, or an image sensor;
calculate a trajectory of a vehicle based on the data;
determine that the trajectory corresponds to a region of interest; and
identify a time window associated with the region of interest,
wherein the dataset comprises data collected in the region of interest.

18. The device of claim 16, wherein the perturbing the first sensor data comprises adjusting a position with respect to one or more directional dimensions and one or more orientation dimensions associated with the first sensor data.

19. The device of claim 16, wherein the instructions are further executable by the one or more processors to:
determine a size of voxels in the voxel space is not a minimum size;
increase a number of voxels in the voxel space;
reduce the size of voxels in the voxel space; and
iteratively determine the transformations to the first sensor data for each reduced size of the voxels,
wherein the calibration of the first sensor of the plurality of sensors is based on an iterative determination of the transformations.

20. The device of claim 16, wherein the indication that the first sensor is out of alignment is a first indication and wherein the instructions are further executable by the one or more processors to:
receive a second indication that the vehicle is located at a reference point at a first time;

capture a first collective dataset at the first time, the first collective dataset comprising a first metaspin associated with at least a portion of the plurality of sensors and corresponding to an environment at the reference point;

receive an indication that the vehicle is located at the reference point at a second time;

capture a second collective dataset at the second time, the second collective dataset comprising a second metaspin associated with the at least the portion of the plurality of sensors and corresponding to the environment at the reference point;

project the first collective dataset and the second collective dataset into the voxel space corresponding to the environment at the reference point;

perturb one or more dimensions of the second collective dataset to minimize a residual value associated with the voxel space; and determine a positioning error between the first time and the second time.

* * * * *